United States Patent [19]
Fukuzaki et al.

[11] Patent Number: 5,600,105
[45] Date of Patent: Feb. 4, 1997

[54] POSITION DETECTING DEVICE AND POSITION POINTING DEVICE THEREFOR

[75] Inventors: Yasuhiro Fukuzaki; Yuji Katsurahira, both of Saitama-ken, Japan

[73] Assignee: Wacom Co., Ltd., Saitama, Japan

[21] Appl. No.: 362,643

[22] Filed: Dec. 23, 1994

[30] Foreign Application Priority Data

Dec. 28, 1993 [JP] Japan .................................. 5-335802

[51] Int. Cl.$^6$ .................................................. G08C 21/00
[52] U.S. Cl. .............................................. 178/19; 345/179
[58] Field of Search ...................... 178/18, 19; 345/156, 345/180, 175, 181

[56] References Cited

U.S. PATENT DOCUMENTS

| | | | |
|---|---|---|---|
| 4,999,461 | 3/1991 | Murakami et al. | 178/19 |
| 5,138,118 | 8/1992 | Russell | 178/19 |
| 5,247,138 | 9/1993 | Landmeier | 178/19 |
| 5,308,936 | 5/1994 | Biggs et al. | 178/19 X |
| 5,349,139 | 9/1994 | Verrier et al. | 178/19 |
| 5,369,227 | 11/1994 | Stone | 178/19 X |
| 5,373,118 | 12/1994 | Watson | 178/19 |
| 5,408,055 | 4/1995 | Harris et al. | 178/19 |
| 5,414,226 | 5/1995 | Matsushima | 178/19 X |

FOREIGN PATENT DOCUMENTS

| | | |
|---|---|---|
| 63-70326 | 3/1988 | Japan . |
| 3-189716 | 8/1991 | Japan . |
| 3-189717 | 8/1991 | Japan . |

*Primary Examiner*—Wellington Chin
*Assistant Examiner*—Paul Loomis
*Attorney, Agent, or Firm*—Lowe, Price, LeBlanc & Becker

[57] ABSTRACT

A position detecting device and a position pointing device therefor, which are capable of sending various types of instructions from a tablet to a cordless position pointing device, thus controlling the operation thereof. The tablet is equipped with an instruction generating means and an electromagnetic wave transmitting means to transmit an electromagnetic wave, which includes an operation state setting instruction, to the position pointing device. The position pointing device is equipped with an electromagnetic wave receiving means, an instruction extracting means, and an operation setting means to receive the electromagnetic wave, which includes the operation state setting instruction, extract the operation state setting instruction, and set the operation state in accordance with the extracted operation state setting instruction, thus enabling the operation state of the position pointing device to be set.

17 Claims, 19 Drawing Sheets

FIG. 5
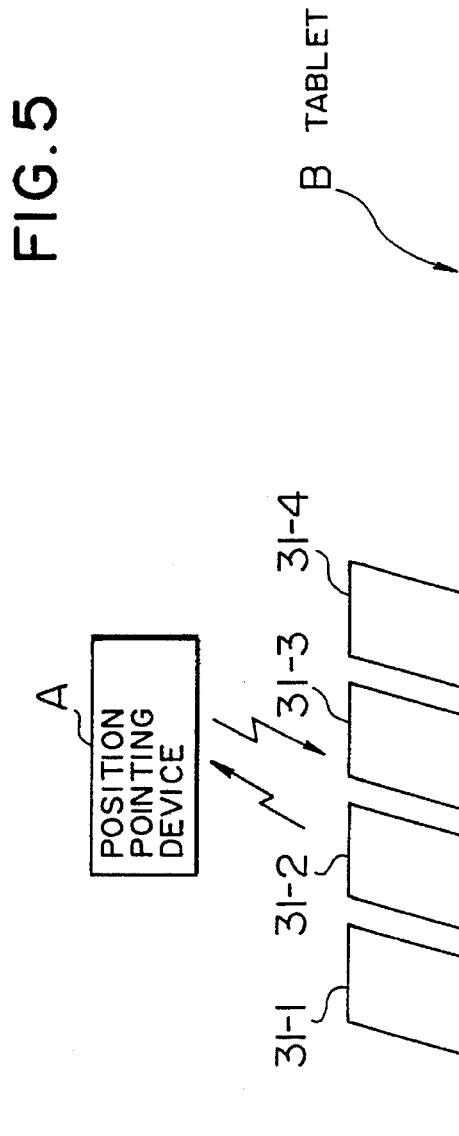
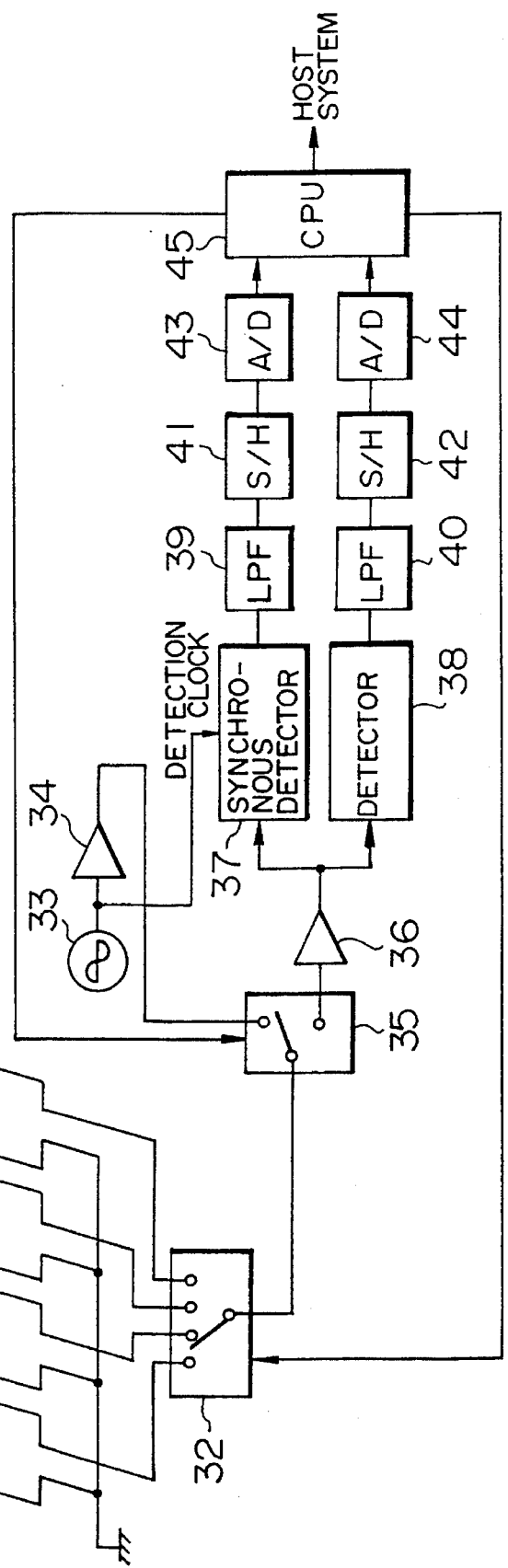

| s2 | s1 |   |
|----|----|---|
| 0  | 0  | a |
| 0  | 1  | b |
| 1  | 1  | c |
| 1  | 0  | c |

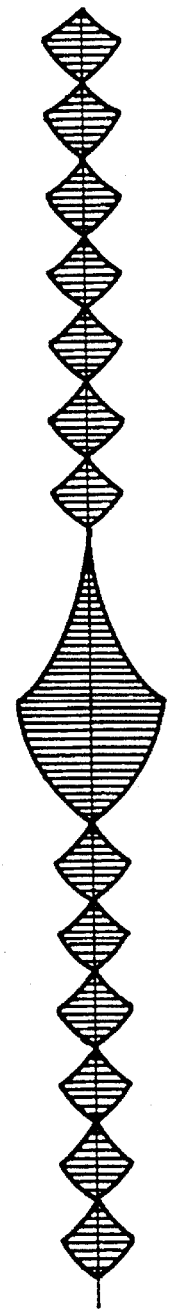
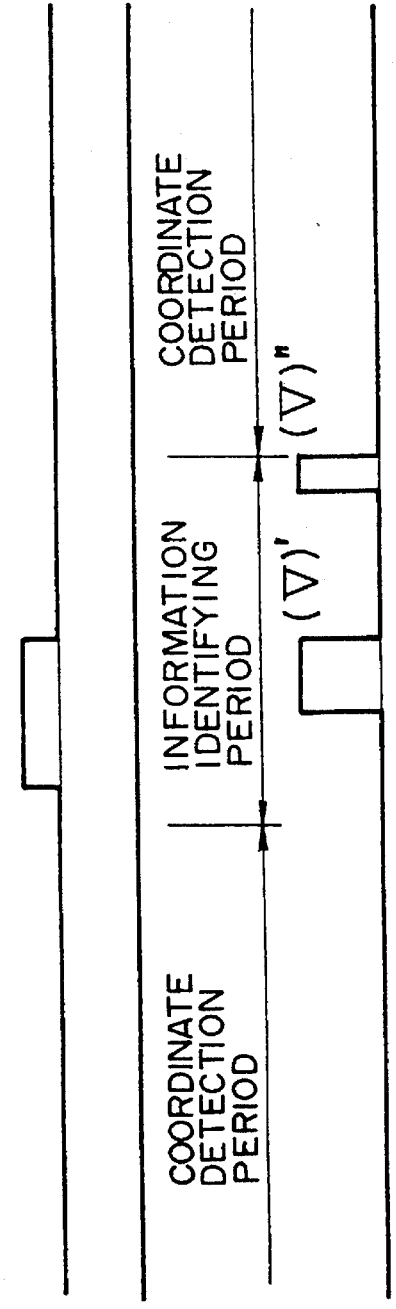
FIG. 10 (I)
FIG. 10 (II)
FIG. 10 (III)
FIG. 10 (VI)
FIG. 10 (IV)
FIG. 10 (VII)
FIG. 10 (V)

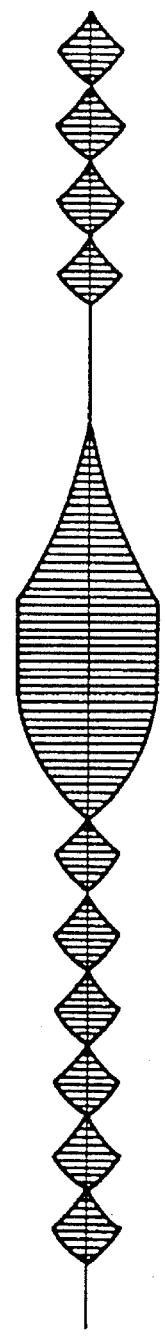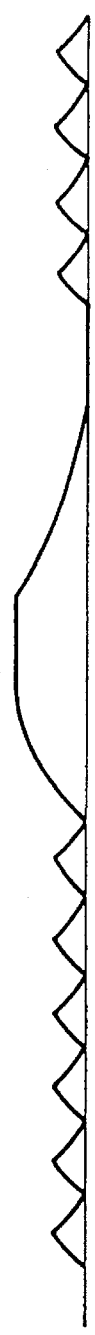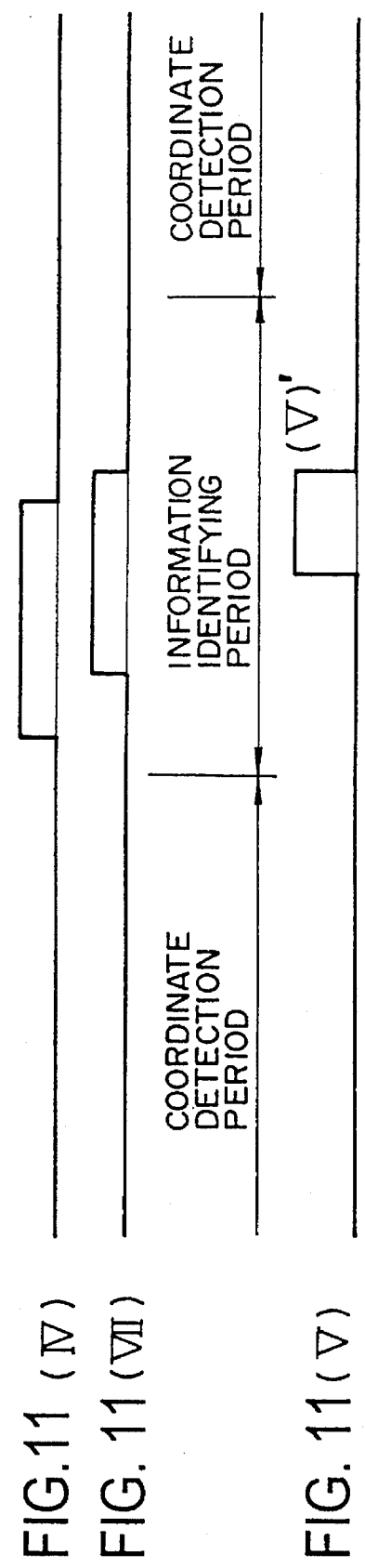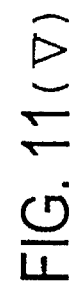

FIG. 14 (VIII) 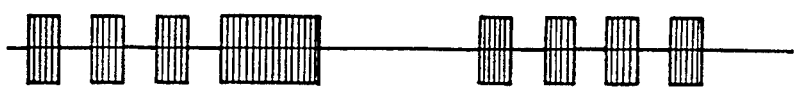
FIG. 14 (IX) 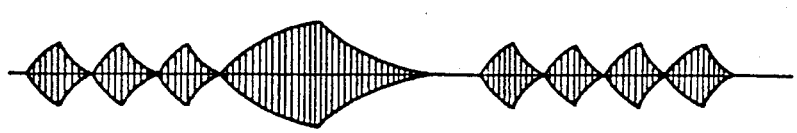

FIG. 14 (XI) 
FIG. 14 (XII) 
FIG. 14 (XIII) 
FIG. 14 (XIV) 
FIG. 14 (XV) 
FIG. 14 (XVI) 
FIG. 14 (XVII) 
FIG. 14 (XVIII) 
FIG. 14 (XIX) 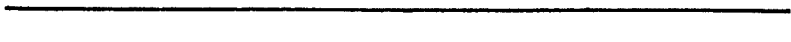

FIG.15 (VIII)
FIG.15 (IX)
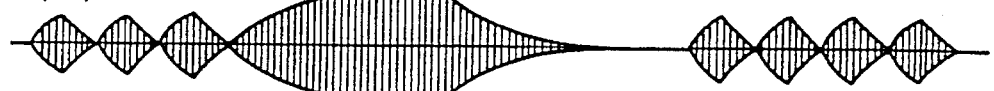
FIG.15 (X)
FIG.15 (XI)
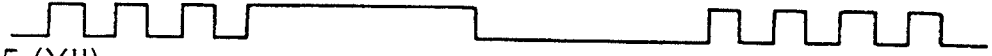
FIG.15 (XII)
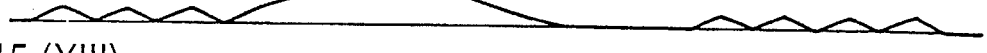
FIG. 15 (XIII)
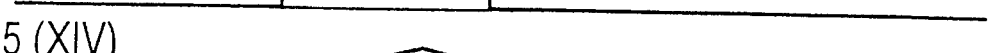
FIG.15 (XIV)
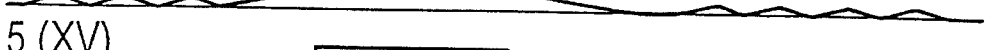
FIG. 15 (XV)
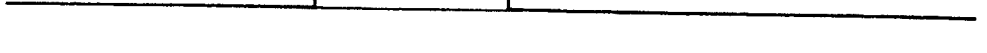
FIG.15 (XVI)
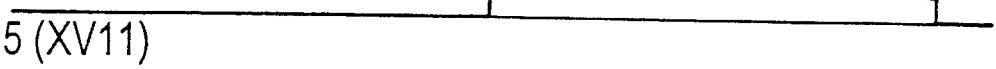
FIG.15 (XV11)
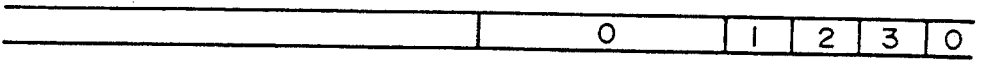
FIG.15 (XVIII)
FIG.15 (XIX)
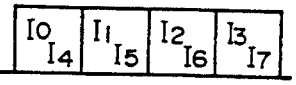

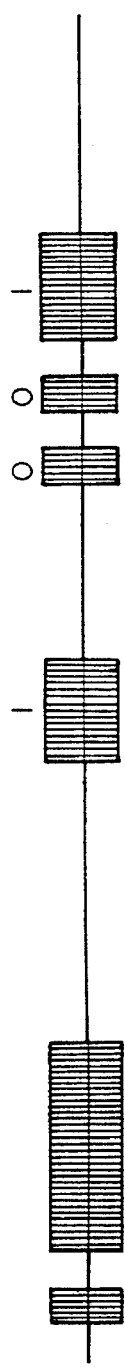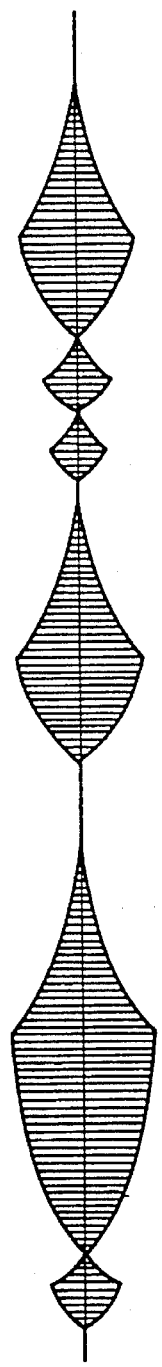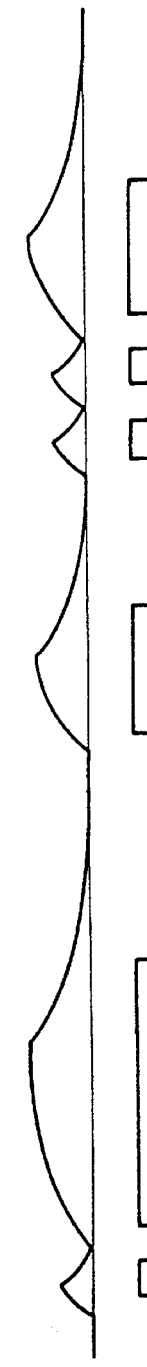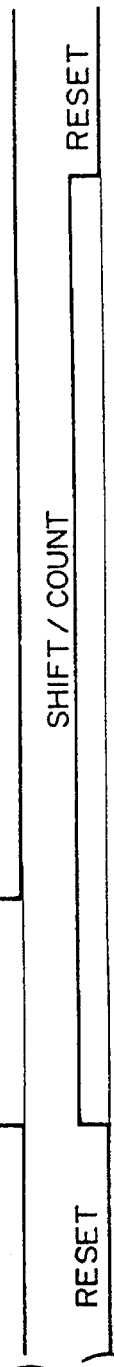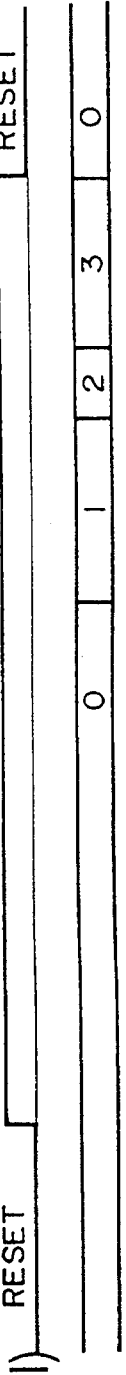
FIG. 18 (XX)
FIG. 18 (XXI)
FIG. 18 (XXII)
FIG. 18 (XIII)
FIG. 18 (XXIV)
FIG. 18 (XXV)
FIG. 18 (XXVI)
FIG. 18 (XXVII)
FIG. 18 (XXVIII)
FIG. 18 (XXIX)

POSITION DETECTING DEVICE AND POSITION POINTING DEVICE THEREFOR

BACKGROUND OF THE INVENTION

1. Field of the Invention

The present invention relates to improvements in a position detecting device and a position pointing device therefor, which employ electromagnetic waves. This application is copending with patent application Ser. Nos. 08/318,171 and 08/359,463.

2. Description of the Related Art

Prior to the instant application, the applicant has proposed, in Japanese Patent Application No. 61-213970 (Japanese Patent Laid-Open No. 63-70326), a position detecting device in which a tablet exchanges electric wave signals with a position pointing device so as to determine the coordinate value of a position pointed by the position pointing device.

Briefly, the position detecting device disclosed in Japanese Patent Laid-Open No. 63-70326 has a plurality of loop coils constituting the tablet and is adapted to transmit an electric wave of a predetermined frequency. The electric wave is received by a resonance circuit provided in the position pointing device so that resonance takes place in the resonance circuit to emit electric wave. This electric wave is received by the loop coil so that a voltage is induced in the loop coil. This operation is conducted successively on the plurality of loop coils constituting the tablet, so that the coordinate value of the position pointed by the position pointing device is determined based on the levels of the voltages induced in the loop coils.

The position detecting device of the type described faces a demand for the ability to enter various kinds of information in addition to the coordinate value of a pointed position, such as information which indicates that the position pointing device, e.g., a pen or the like, has been set to a position for pointing a definite position (this state will be referred to as "pen-down state," hereinafter), information concerning the type of the position pointing device, e.g., a pen, a cursor or the like, as well as a demand for inputting, together with the coordinate values, information for continuously varying values of parameters other than the coordinate information, such as, for example, thickness or width of a line and hue or density (brightness) of the position or area appointed by the pointing device.

To cope with such demands, the position pointing device disclosed in Japanese Patent Laid-Open No. 63-70326 employs a manual switch which selectively connects, to the resonance circuit which is constituted by a coil and a capacitor, an additional capacitor so as to slightly vary the resonance frequency, the slight change in the resonance frequency being detected as a variation in the phase angle so as to be used as information indicative of the aforesaid various types of information (hereinafter referred to as "pointing device information").

The device according to the aforesaid Japanese Patent Laid-Open No. 63-70326 requires, however, that the range, over which the resonance frequency of the resonance circuit varies as the switch is operated, precisely coincide with a predetermined range, which is centered at the frequency of the electric wave transmitted from the loop coil. A laborious adjusting work is required to attain such matching of the frequency ranges. Further, the detectable range of phase angle is limited to be about −60° to about +60°. Furthermore, a certain tolerance for the phase angle to be detected has to be set in order to accommodate any change in the inductance of the coil and in the capacitance of the capacitor of the resonance circuit caused by a change in the ambient temperature, etc. These problems led to a limited number of types of pointing device information, which can be entered, and especially when the resonance frequency is designed to continuously change according to pen pressure, no pointing device information other than pen pressure information can be entered.

Under this circumstance, the same applicant proposed a position detecting device and a position pointing device therefor in Japanese Patent Application No. 1-327276 (Japanese Patent Laid-Open No. 3-189716) and Japanese Patent Application No. 1-327277 (Japanese Patent Laid-Open No. 3-189717), wherein the position pointing device is provided with a code generator, which issues a plurality of particular bits of binary code according to the operation of a switch, an additional capacitor is connected and disconnected to and from the coil and capacitor composing a resonance circuit via an electronic switch in accordance with a plurality of bits of binary code issued from the code generator in order to cause the resonance frequency to change slightly according to the plurality of bits of binary code, and the slight change in the resonance frequency caused by the binary code is detected as a change in phase angle to reproduce the binary code, thereby making it possible to enter a number of pieces of pointing device information, which corresponds to the number of the bits of binary code.

In the position detecting device described above, however, a change in the resonance frequency of the resonance circuit causes a change in the level of a received signal (induced voltage); therefore, accurate detection of a coordinate value cannot be performed if the resonance frequency changes according to the aforesaid binary code during coordinate detection.

To cope with the problem, the device according to Japanese Patent Laid-Open Nos. 3-189716 and 3-189717 is provided with a preset period for coordinate detection and a preset period for identifying a code, the two periods alternating. The tablet transmits an electric wave, which includes timing information for distinguishing these periods, to the position pointing device. The resonance frequency of the resonance circuit is changed in accordance with the plurality of bits of binary code at a certain timing specified by the timing information, thereby supplying (transferring) the pointing device information represented by the plurality of bits of binary code from the position pointing device to the tablet.

The frequency at which the pointing device information is required varies, depending on the type of the aforesaid pointing device information or a host system (or a program involved), which processes the pointing device information together with the coordinate value of a pointed position. In the case of the devices according to Japanese Patent Laid-Open Nos. 3-189716 and 3-189717, the transfer of any pointing device information alternates with the transfer of the coordinate value of a pointed position. This leads to wasteful time spent for information transfer, resulting in a lower sampling rate for coordinate detection.

When transferring, for example, the information on a switch operation state and a pen pressure, which are completely different types of pointing device information, from a single position pointing device to the tablet, it is necessary for the devices according to Japanese Patent Laid-Open Nos. 3-189716 and 3-189717 to switch between the output of the code generator, which generates a binary code corresponding to the operation of the switch, and the output of an analog-digital converter or other device generating a binary code corresponding to the pen pressure in order to apply the outputs to the foregoing electronic switch. This posed a problem of inefficient operation because the operator must manually switch the outputs.

SUMMARY OF THE INVENTION

Accordingly, it is an object of the present invention to provide a position detecting device and a position pointing device therefor, which are capable of sending various instructions from a tablet to a cordless position pointing device to control the operation thereof.

It is another object of the present invention to provide a position detecting device and a position pointing device therefor, which are capable of transferring pointing device information from the position pointing device to the tablet only when necessary.

It is still another object of the present invention to provide a position detecting device and a position pointing device therefor, which are capable of transferring only a required type of pointing device information from the position pointing device to the tablet.

According to one aspect of the present invention, there is provided a position detecting device, wherein a position pointing device having at least two operation states emits an electromagnetic wave, which has certain space distribution corresponding to a coordinate value of a position pointed thereby, and the electromagnetic wave is detected by a tablet to determine the coordinate value of the position pointed by the position pointing device, the position pointing device being equipped with an electromagnetic wave receiving means for receiving an electromagnetic wave, which is transmitted from the tablet and which includes a setting instruction of an operation state, an instruction extracting means for extracting the operation state setting instruction from the received electromagnetic wave, and an operation setting means for setting the operation state in accordance with the operation state setting instruction, and the tablet being equipped with an instruction generating means for generating an operation state setting instruction for the position pointing device and an electromagnetic wave transmitting means for transmitting an electromagnetic wave, which includes the setting instruction of the operation state, to the position pointing device.

The above and other objects, features and advantages of the present invention will become clear from the following description when the same is read in conjunction with the accompanying drawings.

BRIEF DESCRIPTION OF THE DRAWINGS

FIG. 5 is a configuration diagram illustrative of a first embodiment of the tablet of the position detecting device according to the present invention;

FIGS. 10(I)–10(V) are an illustration of operation waveforms corresponding to the second embodiment of the position pointing device;

FIGS. 11(I)–11(V) are an illustration of operation waveforms corresponding to the second embodiment of the position pointing device;

FIGS. 15(VIII)–15(XIX) are an illustration of operation waveforms corresponding to the embodiment of FIG. 13;

FIGS. 18(XX)–18(XXIX) are an illustration of operation waveforms corresponding to the fourth embodiment of the position pointing device.

DESCRIPTION OF THE PREFERRED EMBODIMENTS

Before turning to the description of preferred embodiments, a description will be given of a basic form of the present invention.

Figure 1:
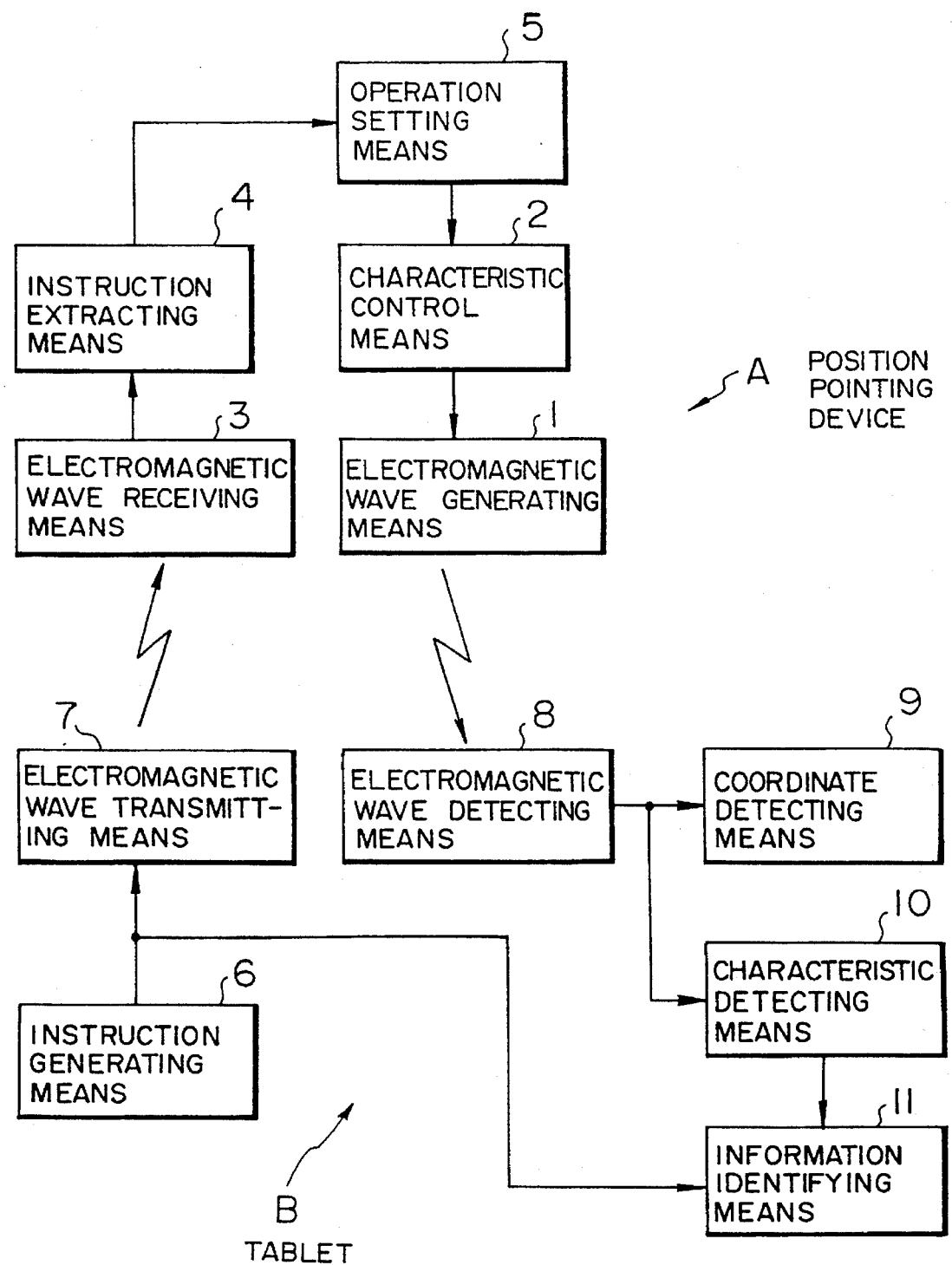
FIG. 1 is a block diagram illustrative of a basic form of the position detecting device and the position pointing device therefor in accordance with the present invention.

FIG. 1 is the block diagram showing the basic form of the position detecting device and the position pointing device therefor according to the present invention. Position pointing device A in accordance with this basic form of the invention has an electromagnetic wave generating means 1 for generating an electromagnetic wave, which has certain space distribution corresponding to the coordinate value of a pointed position, a characteristic control means 2 for controlling the intensity characteristic or the frequency characteristic of the electromagnetic wave produced by the electromagnetic wave generating means 1 or a time-dependent change of these characteristics in accordance with predetermined control information, an electromagnetic wave receiving means 3 for receiving an electromagnetic wave, which includes an operation state setting instruction and which is transmitted from the tablet, an instruction extracting means 4 for extracting the operation state setting instruction from the received electromagnetic wave, and an operation setting means 5 for setting to one of at least two operation states in accordance with the operation state setting instruction and making it possible to enter the information based on the set operation state as the predetermined control information.

Tablet B includes an instruction generating means 6 for issuing an operation state setting instruction for position pointing device A, an electromagnetic wave transmitting means 7 for transmitting an electromagnetic wave, which includes the operation state setting instruction, to position pointing device A, an electromagnetic wave detecting means 8 for detecting an electromagnetic wave, which has a certain space distribution and which is generated by position pointing device A, a coordinate detecting means 9 for determining the coordinate value of a position appointed by position pointing device A from the detected electromagnetic wave, a characteristic detecting means 10 for detecting the intensity characteristic or frequency characteristic or the time-dependent change of these characteristics of the detected electromagnetic wave, and an information identifying means 11 for identifying information from the detected characteristics of the electromagnetic wave.

As the at least two operation states in the position pointing device mentioned above, there are, for example, a state, wherein the electromagnetic wave having certain space distribution corresponding to the coordinate value of the pointed position is generated, and a state, wherein such an electromagnetic wave is not generated. These states are set by setting the intensity characteristic of the electromagnetic wave emitted from the electromagnetic wave generating means 1 to a predetermined level and zero, respectively, by the characteristic control means 2.

There are other operation states; in one state, the pointing device information is transferred, and in the other state, no pointing device information is transferred.

Figure 2:
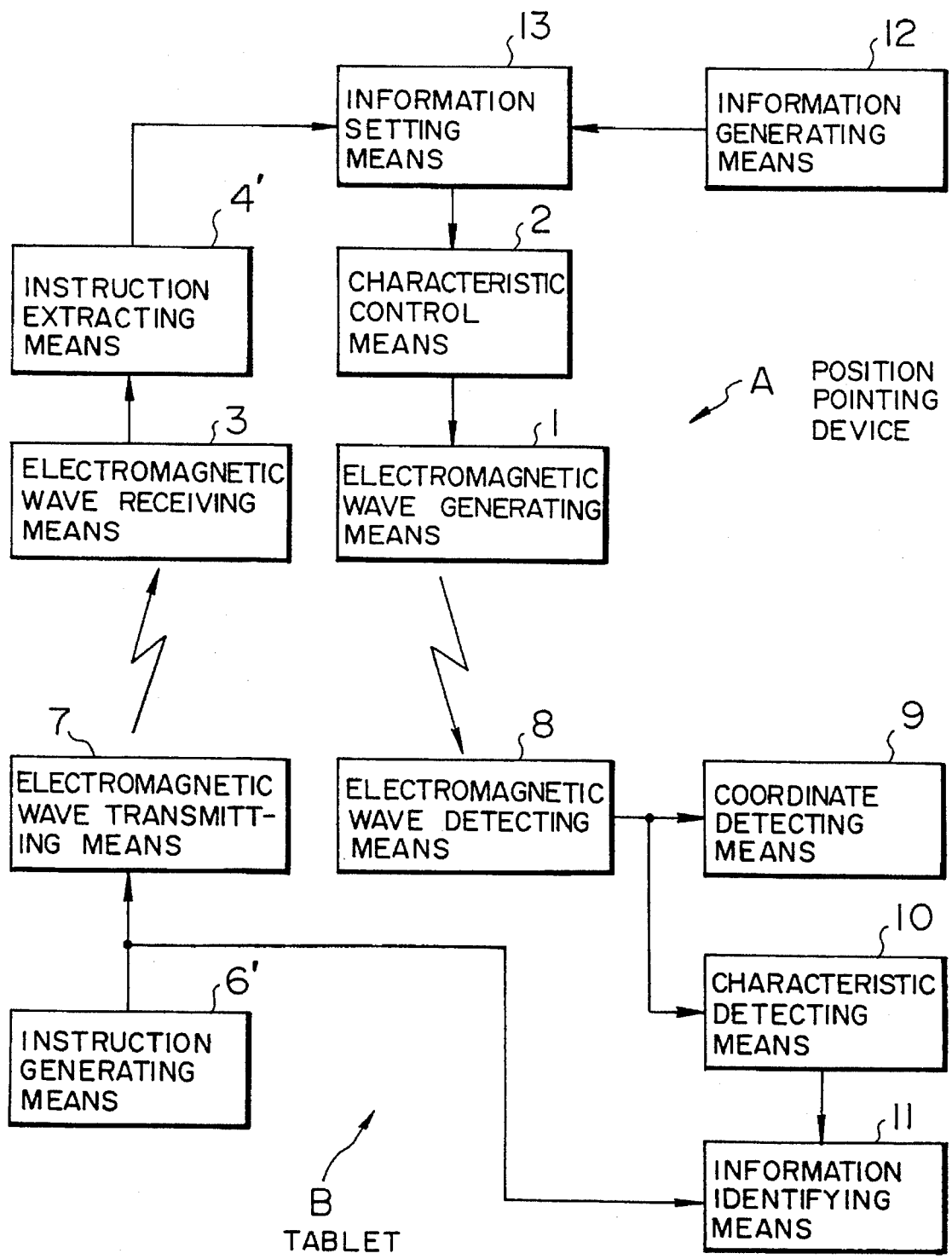
FIG. 2 is a block diagram illustrative of another basic form of the position detecting device and the position pointing device therefor in accordance with the present invention.

FIG. 2 shows another basic form of the position detecting device and the position pointing device therefor in accordance with the present invention, corresponding to the case described above. The same component units as those of FIG. 1 are given the same reference numerals. Specifically, position pointing device A in FIG. 2 includes the electromagnetic wave generating means 1, the characteristic control means 2, the electromagnetic wave receiving means 3, the instruction extracting means 4' for extracting the instruction requesting the pointing device information from the received electromagnetic wave, an information generating means 12 for generating at least one piece of pointing device information, and an information setting means 13 for setting the aforesaid pointing device information as the predetermined control information in accordance with the instruction for requesting the pointing device information.

Tablet B includes an instruction generating means 6' for issuing the instruction requesting the pointing device information from position pointing device A, the electromagnetic wave transmitting means 7, the electromagnetic wave detecting means 8, the coordinate detecting means 9, the characteristic detecting means 10, and an information identifying means 11' for identifying the pointing device information from the detected characteristics of the electromagnetic wave.

There is also a case, where one type out of a plurality of types of pointing device information needs to be selected and transferred.

Figure 3:
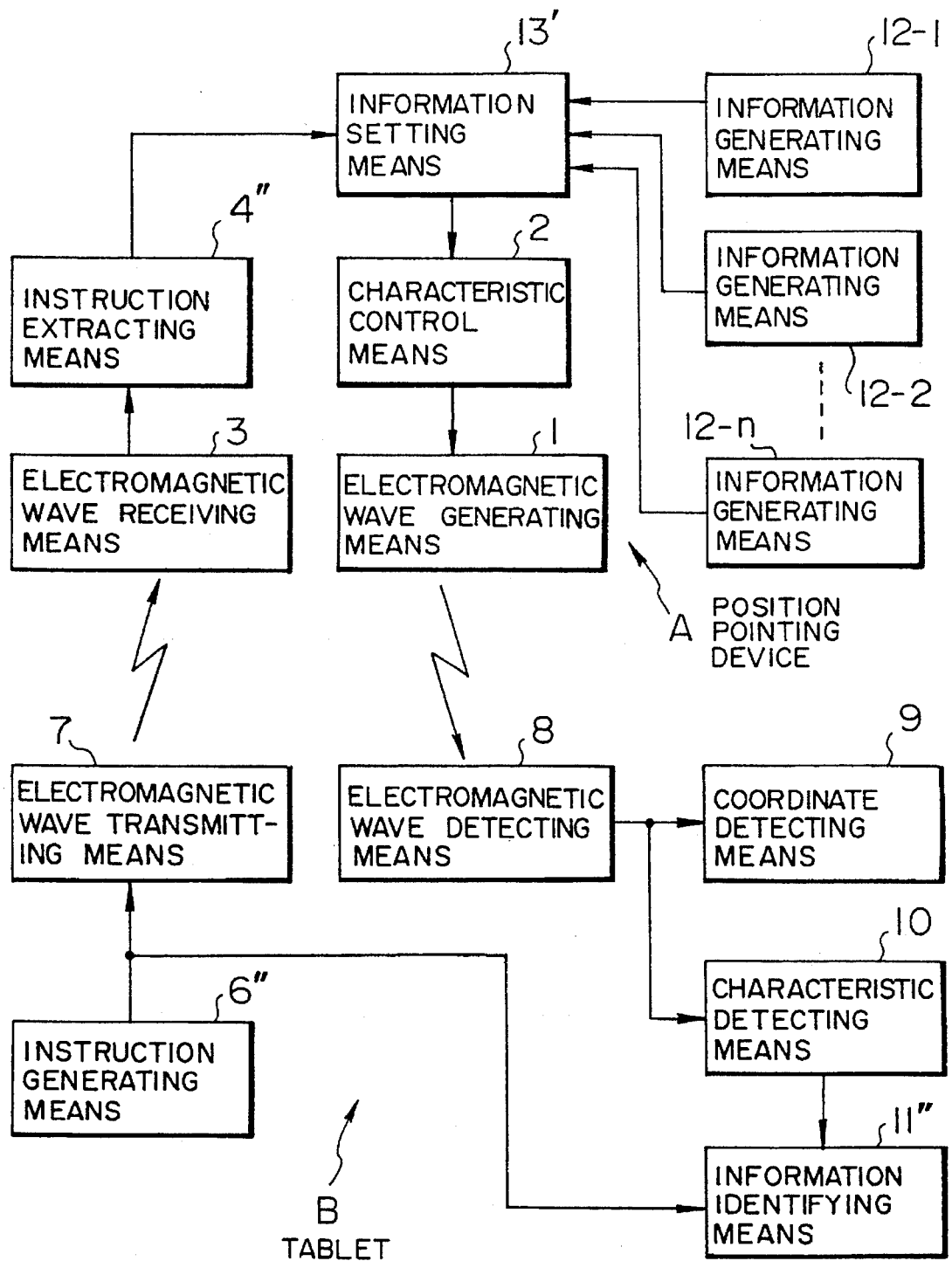
FIG. 3 is a block diagram illustrative of still another basic form of the position detecting device and the position pointing device therefor in accordance with the present invention.

FIG. 3 shows still another basic form of the position detecting device and the position pointing device therefor according to the present invention, corresponding to the case mentioned above. The same component units as those of FIG. 1 and FIG. 2 are given the same reference numerals. Specifically, position pointing device A shown in FIG. 3 has the electromagnetic wave generating means 1, the characteristic control means 2, the electromagnetic wave receiving means 3, and an instruction extracting means 4" for extracting an instruction requesting a predetermined type of pointing device information from the received electromagnetic wave. Position pointing device A further includes a plurality of types of information generating means 12-1, 12-2, . . . 12-n for generating a plurality of types of pointing device information, and an information setting means 13' for setting an appropriate type of pointing device information among the plurality of types of pointing device information as the predetermined control information in accordance with the instruction requesting the pointing device information.

Tablet B shown in FIG. 3 has an instruction generating means 6" for generating an instruction requesting a predetermined type of pointing device information from position pointing device A, the electromagnetic wave transmitting means 7, the electromagnetic wave detecting means 8, the coordinate detecting means 9, the characteristic detecting means 10, and an information identifying means 11" for identifying the predetermined type of pointing device information from the detected characteristic of the electromagnetic wave.

The instruction directed to position pointing device A should preferably be represented by the duration or pause of the electromagnetic wave transmitted from tablet B. A resonance circuit should preferably be used for the electromagnetic wave receiving means 3 of position pointing device A. The resonance circuit may be employed as the electromagnetic wave generating means 1. In this case, the characteristic control means 2 of position pointing device A can be accomplished by changing the resonance characteristic of the resonance circuit. It is also desirable to provide a power source extracting means for extracting the electrical energy for driving the component units of position pointing device A from the electromagnetic wave received by the resonance circuit.

In FIG. 1, when the instruction generating means 6 of tablet B issues an instruction for setting, for instance, the operation state, wherein no electromagnetic wave is generated, an electromagnetic wave, which includes the instruction, is transmitted from the electromagnetic wave transmitting means 7. The electromagnetic wave is received by the electromagnetic wave receiving means 3 of position pointing device A and the instruction for engaging the operation state, wherein no electromagnetic wave is generated, is extracted from the received electromagnetic wave by the instruction extracting means 4. The operation setting means 5 engages the operation state, wherein no electromagnetic wave is generated, in response to the instruction. More specifically, the operating setting means 5 stops the operation of the electromagnetic wave generating means 1 via the characteristic control means 2. As a result, an electromagnetic wave is no longer detected by the electromagnetic wave detecting means 8 of tablet B, and this naturally causes the intensity of the electromagnetic wave detected by the characteristic detecting means 10 to become zero. This is identified by the information identifying means 11 and it is recognized that the instruction issued from the instruction generating means 6 has properly been executed.

Likewise, in FIG. 2, when the instruction requesting the pointing device information is issued from the instruction generating means 6' of tablet B, an electromagnetic wave, which includes the instruction, is transmitted from the electromagnetic wave transmitting means 7. The electromagnetic wave is received by the electromagnetic wave receiving means 3 of position pointing device A, and the instruction requesting the pointing device information is extracted from the received electromagnetic wave by the instruction extracting means 4'. The information setting means 13 sets the pointing device information generated by the information generating means 12 in the characteristic control means 2 as the predetermined control information in accordance with the instruction. The characteristic control means 2 controls the intensity characteristic or frequency characteristic or the time-dependent changes of these characteristics of the electromagnetic wave emitted by the electromagnetic wave generating means 1 in accordance with the foregoing pointing device information.

The aforesaid electromagnetic wave is detected by the electromagnetic wave detecting means 8 of tablet B, and the intensity characteristic or frequency characteristic or the time-dependent changes of these characteristics of the detected electromagnetic wave are detected by the characteristic detecting means 10, then the pointing device information is identified by the information identifying means 11'.

In FIG. 3, when the instruction requesting a predetermined type of the pointing device information is issued from the instruction generating means 6" of tablet B, an electromagnetic wave, which includes the instruction, is transmitted from the electromagnetic wave transmitting means 7. The electromagnetic wave is received by the electromagnetic wave receiving means 3 of position pointing device A, and the instruction requesting the predetermined type of pointing device information is extracted from the received electromagnetic wave by the instruction extracting means 4". The information setting means 13' sets the pointing device information generated by an appropriate information generating means, e.g., 12-1, among the information generating means 12-1 through 12-n in the characteristic control means 2 as the predetermined control information in accordance with the instruction. The characteristic control means 2 controls the intensity characteristic or frequency characteristic or the time-dependent changes of these characteristics of the electromagnetic wave emitted by the electromagnetic wave generating means 1 in accordance with the foregoing pointing device information.

The electromagnetic wave is detected by the electromagnetic wave detecting means 8 of tablet B, the intensity characteristic or the frequency characteristic or the time-dependent changes of these characteristics of the detected electromagnetic wave are detected by the characteristic detecting means 10, and the pointing device information is identified by the information identifying means 11".

Representing an instruction for position pointing device A by the duration or pause of the electromagnetic wave makes it possible to transfer the instruction by a simple configuration. Employing a resonance circuit for the electromagnetic wave receiving means 3 permits efficient receiving of an electromagnetic wave. Likewise, employing the resonance circuit as the electromagnetic wave generating means 1 also permits efficient generation of an electromagnetic wave. In this case, the characteristics of an electromagnetic wave sent to the tablet can be controlled by changing the resonance characteristic of the resonance circuit through the characteristic control means 2. Further, providing a power source extracting means for extracting electrical energy from the electromagnetic wave received by the resonance circuit enables a power source to be obtained for driving the component units.

The following describes the embodiments according to the present invention with reference to the attached drawings.

Figure 4:
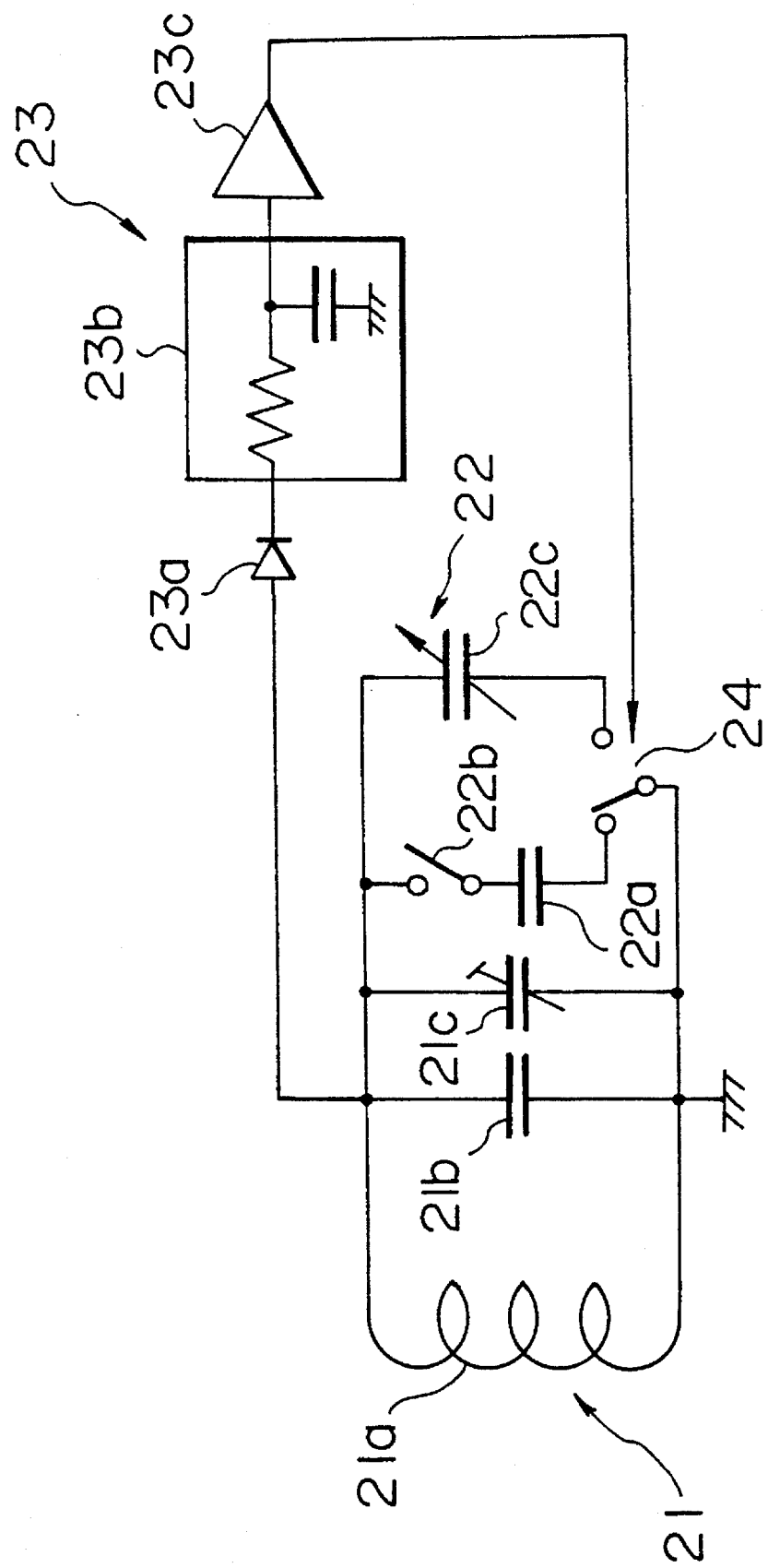
FIG. 4 is a configuration diagram illustrative of a first embodiment of the position pointing device according to the present invention.

FIG. 4 illustrates the first embodiment of the position pointing device according to the present invention. Position pointing device A shown in the Figure has a coil 21a, capacitors 21b, 22a, a semi-fixed capacitor 21c, a switch 22b, a variable capacitor 22c, a detecting circuit (diode) 23a, a low-pass filter 23b, a comparator 23c, and a selector switch 24.

The coil 21a, the capacitor 21b, and the semi-fixed capacitor 21c are connected with each other in series, constituting a well-known resonance circuit 21. The resonance circuit 21 constitutes the foregoing electromagnetic wave generating means and the electromagnetic wave receiving means.

The capacitor 22a and the switch 22b are connected in series and are connected to the capacitor 21b of the resonance circuit 21 in parallel via the selector switch 24 and they change the resonance frequency of the resonance circuit 21 according to the turning ON or OFF of the switch 22b. The variable capacitor 22c is connected in parallel to the capacitor 21b of the resonance circuit 21 via the selector switch 24 and it changes the resonance frequency of the resonance circuit 21 according to the capacitance value of the variable capacitor 22c. These component units constitute a characteristic control means 22. Among these components, the switch 22b and the variable capacitor 22c constitute the information generating means. Normally, the switch 22b is a side switch provided on a side surface of a pen-shaped enclosure (not shown) of position pointing device A, and the variable capacitor 22c is a capacitor with pressure-dependent capacitance, the capacitance value thereof varying with the pressure applied to the core (not shown) of position pointing device A.

The detecting circuit 23a, the low-pass filter 23b, and the comparator 23c constitute an instruction extracting means 23, which takes out, by means of the low-pass filter 23b of a predetermined time constant (t), only the induced voltage lasting for a predetermined time length or more from the induced voltage generated in the resonance circuit 21 and shapes the waveform thereof to generate a switching signal. The selector switch 24 constitutes an information setting means, which normally selects the capacitor 22a and the switch 22b and selects the variable capacitor 22c only while the switching signal is being applied. The power source of the comparator 23c is obtained from a battery (not shown) or a rectifier circuit, which rectifies the induced voltage occurring in the resonance circuit 21, the threshold voltage thereof being a half of the line voltage.

FIG. 5 illustrates the first embodiment of the tablet of the position detecting device in accordance with the present invention. Tablet B shown in the Figure includes loop coils 31-1, 31-2, 31-3, and 31-4, a selector circuit 32, an oscillator 33, a current driver 34, a transmit/receive selector circuit 35, a receiving amplifier 36, a synchronous detector 37, a detector 38, low-pass filters (LPF) 39, 40, sample holding circuits (S/H) 41, 42, analog-digital (A/D) converting circuits 43, 44, and a central processing unit (CPU) 45.

The loop coils 31-1 through 31-4 are arranged nearly in parallel to each other in the position detecting direction, one sides thereof being connected to the selector circuit 32, while the other sides thereof being grounded in common. The selector circuit 32 selects one of the loop coils 31-1 through 31-4 in a manner to be discussed later according to a selecting signal received from the central processing unit 45.

The oscillator 33 generates a sinusoidal AC signal of a frequency almost equal to the resonance frequency of the resonance circuit 21 of position pointing device A and sends it out to the current driver 34 and the synchronous detector 37. The current driver 34 converts the AC signal to an electric current and send it out to the transmit/receive selector circuit 35. The transmit/receive selector circuit 35 connects the loop coil, which has been selected by the selector circuit 32, to the current driver 34 and the receiving amplifier 36 alternately in accordance with the transmit/receive switching signal received from the central processing unit 45 as it will be discussed later.

The receiving amplifier 36 amplifies the induced voltage, which is generated in the selected loop coil and supplied via the selector circuit 32 and the transmit/receive selector circuit 35, and sends it out to the synchronous detector 37 and the detector 38.

The synchronous detector 37 synchronously detects the induced voltage generated in the foregoing selected loop coil, i.e., the received signal, by using the AC signal from the oscillator 33 as the detection signal and sends it out to the low-pass filter 39. The detector 38 detects the induced voltage, which has occurred in the selected loop coil, i.e., the received signal, and sends it out to the low-pass filter 40.

The low-pass filters 39, 40 have a cut-off frequency, which is well lower than the resonance frequency of the resonance circuit 21 mentioned above, and they convert the output signals of the synchronous detector 37 and the detector 38 into DC signals, then send them out to the A/D converting circuits 43, 44 via the sample holding circuits 41, 42. The A/D converting circuits 43, 44 subject the outputs of the low-pass filters 39, 40 to analog-to-digital conversion before supplying them to the central processing unit 45.

The central processing unit 45 calculates the position of the resonance circuit 21 in accordance with the level distribution of each of the received signals, which have occurred in the loop coils 31-1 through 31-4 during the coordinate detection period to be discussed later and which have been converted to digital values through the A/D converting circuit 44, detects the difference in phase from the AC signal received from the oscillator 33 in accordance with the level of a received signal, which has occurred in a loop coil located closest to the position of the resonance circuit 21 among the loop coils 31-1 through 31-4 and which has been converted to a digital value through the A/D converting circuit 43, at a timing immediately after the timing when an electromagnetic wave is generated for a predetermined time length or more during the information identifying period to be explained later, and identifies the change in the resonance frequency of the resonance circuit 21 caused by the variable capacitor 22c, i.e., the pen pressure, from the phase difference. The central processing unit 45 then detects the phase difference in accordance with the level of the received signal, which has occurred in the same loop coil mentioned above and which has been converted to a digital value through the A/D converting circuit 43, at a timing immediately after the timing when an electromagnetic wave occurs for a certain duration, which is well shorter than the above-mentioned predetermined time length, and identifies the change in the resonance frequency of the resonance circuit 21 caused by the capacitor 22a, i.e., whether the switch 22b is ON or OFF.

Figure 6:
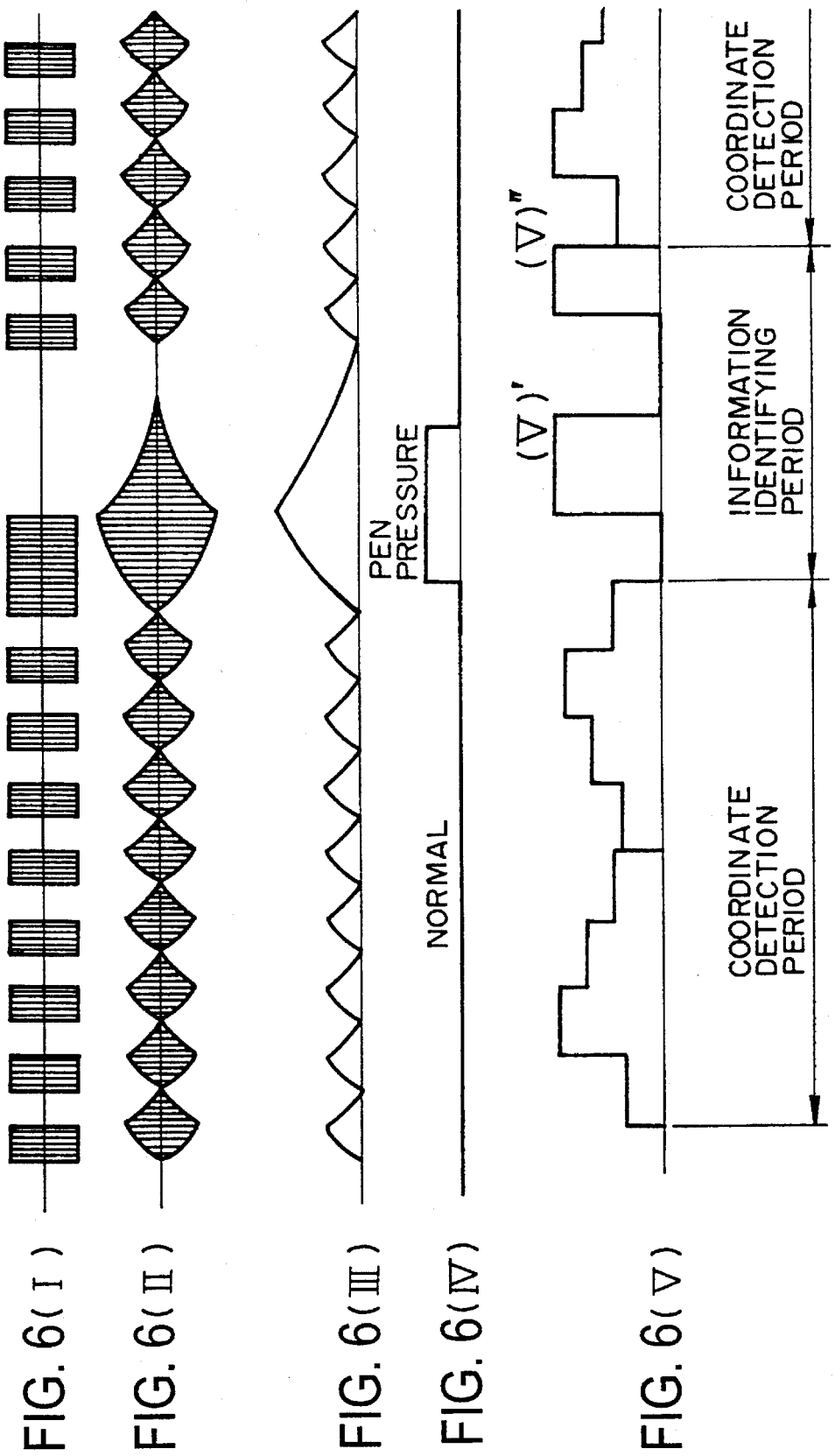
FIGS. 6(I)–6(V) are an illustration of operation waveforms in the first embodiment.

FIG. 6 illustrates the operation waveforms in the first embodiment. The operations of the aforesaid position detecting device and the position pointing device will now be described in conjunction with the operation waveforms. Tablet B described above is designed for position detection in one direction; however, in this case, a plurality of loop coils similar to the loop coils 31-1 through 31-4 are arranged so that they cross orthogonally therewith, selector circuits similar to those described above are provided, and other circuits are used in a switching mode so as to perform alternate position detection, thus detecting a pointed position in two orthogonal directions (x and y directions). The Figure shows the waveforms obtained from the configuration described above.

The operations of the devices are roughly divided into those carried out during the coordinate detection period and those carried out during the information identifying period, and the operations in these two periods are repeated alternately. The information identifying period, however, may be inserted only when necessary.

During the coordinate detection period, the central processing unit 45 controls the transmit/receive switching circuit 35 so that the output of the selector circuit 32 is alternately connected to the current driver 34 and the receiving amplifier 36 for a predetermined duration at certain intervals and it also controls the selector circuit 32 so that a loop coil closest to the position pointing device A among the loop coils 31-1 through 31-4 is selected while the output is being connected to the current driver 34, i.e., while an electromagnetic wave is being generated, and the loop coils 31-1 through 31-4 are selected in sequence when the output is being connected to the receiving amplifier 36, i.e., while the electromagnetic wave is being detected.

During the information identifying period, the central processing unit 45 controls the transmit/receive circuit 35 so that the output of the selector circuit 32 is connected continuously to the current driver 34 for a predetermined time length or more, which is well longer than the predetermined duration mentioned above and after that connected continuously to the receiving amplifier 36 for approximately the same time length as the predetermined time length and further connected alternately to the current driver 34 and the receiving amplifier 36 for a given duration, which is well shorter than the predetermined time length (the same predetermined duration during the coordinate detection period). The central processing unit 45 also controls the selector circuit 32 so that the loop coil located most closely to position pointing device A is selected among the loop coils 31-1 through 31-4 while the output of the selector circuit 32 is being connected to the current driver 34, i.e., while the electromagnetic wave is being generated, and also while it is being connected to the receiving amplifier 36, i.e., while the electromagnetic wave is being detected.

The operation of the tablet during the coordinate detection period will be omitted because it is well known in the previously mentioned Japanese Patent Laid-Open No. 63-70326, No. 3-189716, and No. 3-189717, etc. Electromagnetic wave I, which is generated for a predetermined duration at fixed intervals in the loop coil closest to the resonance circuit 21 of position pointing device A of tablet B during the coordinate detection period causes similar induced voltage II to appear in the resonance circuit 21 of position pointing device A and it is detected by the diode 23a, then it passes through the low-pass filter 23b. At this point, output III of the low-pass filter 23b does not exceed the threshold value of the comparator 23c and no switching signal is issued; therefore, the selector switch 24 is connected to the capacitor 22a and the switch 22b. If the ON state or the OFF state of the switch 22b is changed during the coordinate detection period, then the level of received signal (induced voltage) V of tablet B changes, preventing accurate coordinate detection from being performed. For this reason, if the output value of the A/D converting circuit 43 changes during the coordinate detection period, the then coordinate value is discarded.

During the information identifying period, which follows the coordinate detection period, when electromagnetic wave I lasting for a predetermined time length or more, which is well longer than the aforesaid predetermined duration, is generated from the loop coil closest to the resonance circuit 21 of position pointing device A of tablet B, electromagnetic wave I causes like induced voltage II to appear in the resonance circuit 21 of position pointing device A. Induced voltage II causes the comparator 23c to generate switching signal IV. Switching signal IV causes the selector switch 24 to be connected to the variable capacitor 22c.

Induced voltage II based on the electromagnetic wave, which has lasted for the predetermined time length or more, causes the loop coil nearest to the resonance circuit 21 of position pointing device A of tablet B to generate received signal (induced voltage) V' involving a phase shift based on the capacitance value of the variable capacitor 22c. Induced voltage V' is converted into a signal of a level based on the difference in phase from the AC signal received from the oscillator 33 by the synchronous detector 37 and the low-pass filter 39 and further converted into a digital value by the A/D converting circuit 43. Based on the digital value, the central processing unit 45 identifies the change in the resonance frequency of the resonance circuit 21 caused by the variable capacitor 22c, i.e., the pen pressure.

When switching signal IV disappears, the selector switch 24 is connected back to the capacitor 22a and the switch 22b. Then, induced voltage II based on the electromagnetic wave, which has lasted for the time length, which is well shorter than the predetermined time length, causes the loop coil nearest to the resonance circuit 21 of position pointing device A of tablet B to generate a received signal (induced voltage) V' with no phase shift (provided the resonance frequency of the resonance circuit 21 precisely coincides with the oscillation frequency of the oscillator 33) if the switch 22b is OFF, or a received signal (induced voltage) V' with a phase shaft based on the capacitance value of the capacitor 22a if the switch 22b is ON.

Induced voltage V' is converted by the synchronous detector 37 and the low-pass filter 39 into a signal of the level based on the phase difference from the AC signal received from the oscillator 33 and it is further converted into a digital value by the A/D converting circuit 43. Based on the digital value, the central processing unit 45 identifies the change in the resonance frequency of the resonance circuit 21 caused by the capacitor 22a, i.e., whether the switch 22b is ON or OFF.

The central processing unit 45 sends the pointing device information to a host system together with the coordinate value of the pointed position. After that, the coordinate detection period comes again and the coordinate detection and information identification described above are repeated.

Thus, according to this embodiment, the connection of the switch 24 of the position pointing device A can be switched by changing the duration of the electromagnetic wave emitted from tablet B. This makes it possible for tablet B to switch the pointing device information transferred from position pointing device A to tablet B, enabling required pointing device information to be obtained only when necessary according to the operation of the host system or the program used. The ON state and the OFF state of the switch 22b can be identified even during the coordinate detection period.

Figure 7:
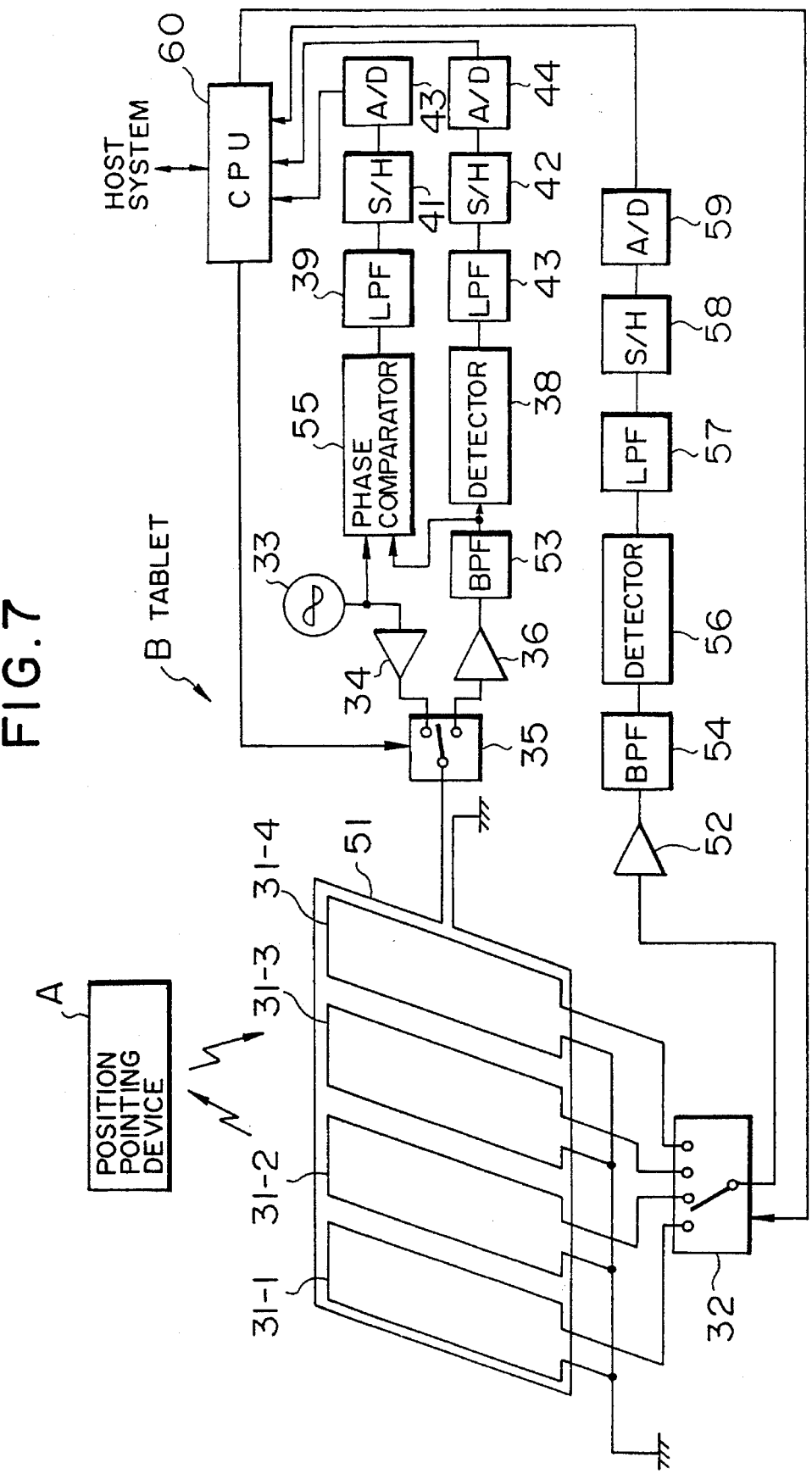
FIG. 7 is a configuration diagram illustrative of a second embodiment of the tablet of the position detecting device according to the present invention.

FIG. 7 illustrates the second embodiment of the tablet of the position detecting device according to the present invention. This embodiment gives an example, wherein an auxiliary antenna coil is used to generate electromagnetic waves and to receive electromagnetic waves related to information identification. In the Figure, reference numeral 51 denotes an auxiliary antenna coil, which is arranged so as to surround the loop coils 31-1 through 31-4, one end thereof being connected to a switching circuit 35, while the other end thereof being grounded. Reference numeral 52 denotes a receiving amplifier connected directly to the selector circuit 32.

Reference numerals 53, 54 indicate band-pass filters, which employ the resonance frequency of the resonance circuit 21 as the center frequency thereof. The band-pass filters 53, 54 take out only a component in the vicinity of the resonance frequency from the induced voltage mentioned above via the receiving amplifiers 36 and 52, respectively. Reference numeral 55 denotes a phase comparator, which compares the phase of an output signal of the band-pass filter 53, i.e., the resonance frequency component of the induced voltage Generated in the auxiliary antenna coil 51, and the phase of an AC signal received from the oscillator 33 and sends out a phase difference signal to the low-pass filter 39.

A detector 56, a low-pass filter (LPF) 57, a sample holding circuit (S/H) 58, and an analog-digital (A/D) converting circuit 59 detect received signals, which are generated in the loop coils 31-1 through 31-4 and output via the selector circuit 32, the receiving amplifier 52, and the band-pass filter 54, convert them into DC signals, and further convert them to digital signals.

A central processing unit (CPU) 60 calculates the position of the resonance circuit 21 of position pointing device in accordance with the level distribution of the received signals, which were generated in the loop coils 31-1 through 31-4 during the coordinate detection period and which have been converted to digital values by the A/D converting circuit 59, and detects the difference in phase from the AC signal received from the oscillator 33 in accordance with the level of the received signal, which was produced in the auxiliary antenna coil 51 at a timing immediately after the electromagnetic wave was generated continuously for a predetermined time length or more during the information identifying period and which has been converted to a digital value by the A/D converting circuit 43. Based on the detected phase difference, the central processing unit 60 identifies the change in the resonance frequency of the resonance circuit 21 caused by the variable capacitor 22c, i.e., the pen pressure, then it detects the phase difference in accordance with the level of a received signal, which has been converted to a digital value by the A/D converting circuit 43, at a timing immediately after the timing when an electromagnetic wave was generated for a certain duration, which is well shorter than the predetermined time length. Based on the detected phase difference, the central processing unit 60 identifies the change in the resonance frequency of the resonance circuit 21 caused by the capacitor 22a, i.e., whether the switch 22b is ON or OFF.

According to this embodiment, the auxiliary antenna coil is employed to generate electromagnetic waves and to receive electromagnetic waves associated with information identification. This eliminates the need for selecting a loop coil in accordance with the position of position pointing device A when an electromagnetic wave is generated during the coordinate detection period or during the information identifying period, thus permitting quicker movement of position pointing device A and reduced load on the central processing unit 60.

The detector 38, the low-pass filter 40, the sample holding circuit 42, and the A/D converting circuit 44 are used only if the characteristic control in the resonance circuit of position pointing device A would cause received signals to incur level fluctuation, which is irrelevant to phase, such as in a case, where carrying out the control would cause the loss in the resonance circuit to change.

Figure 8:
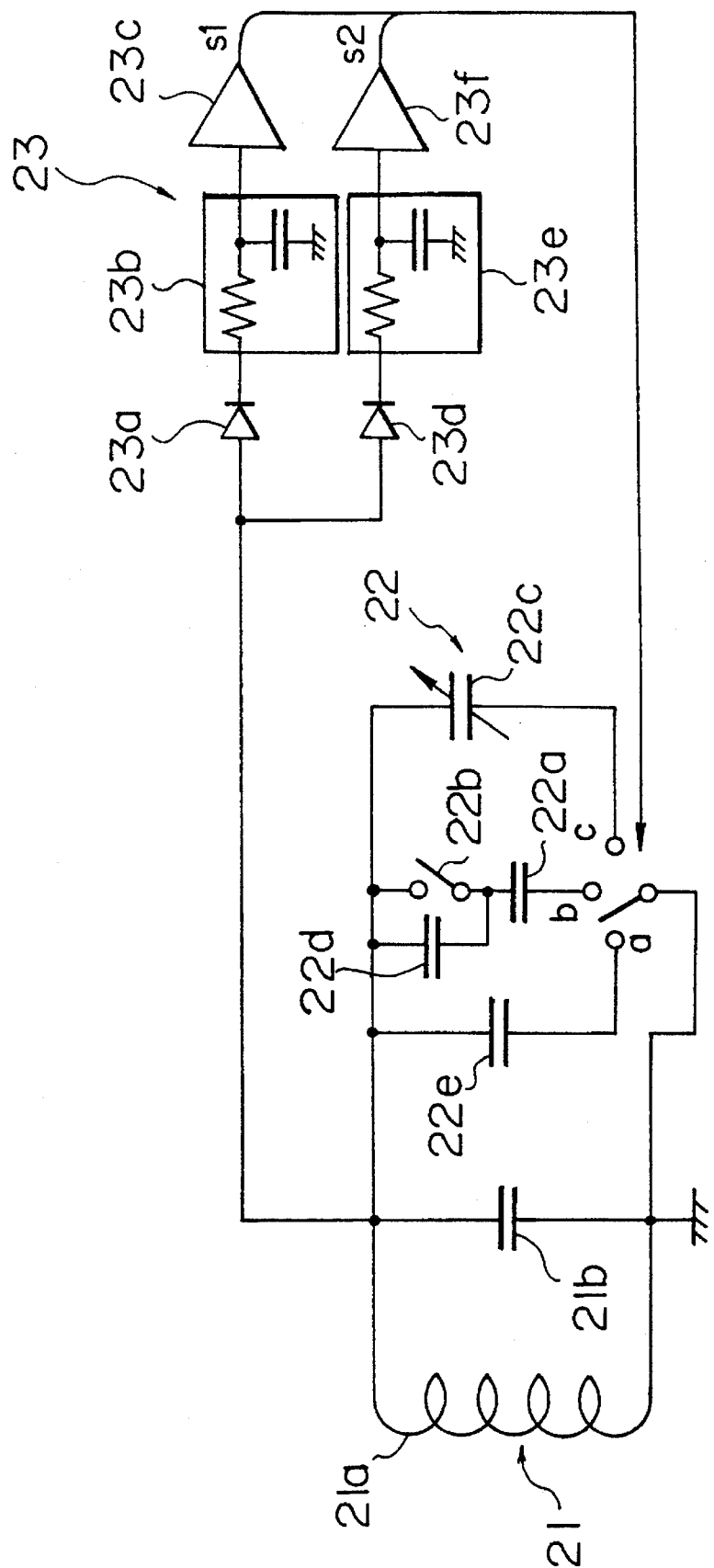
FIG. 8 is a configuration diagram illustrative of a second embodiment of the position pointing device according to the present invention.

FIG. 8 illustrates the second embodiment of the position pointing device in accordance with the present invention. In the Figure, the same component units as those of the first embodiment are given the same reference numerals. Position pointing device A shown in this drawing includes the coil 21a, the capacitors 21b, 22a, 22d, and 22e, the variable capacitor 22c, the switch 22b, the detecting circuits 23a, 23d (diodes), the low-pass filters 23b, 23e, the comparators 23c, 23f, and a selector switch 25.

The coil 21a and the capacitor 21b are connected in series, constituting the well-known resonance circuit 21. The resonance circuit 21 constitute the aforesaid electromagnetic wave generating means and the electromagnetic wave receiving means.

The capacitor 22a and the switch 22b are connected in series and they are connected to the capacitor 21b of the resonance circuit 21 in parallel via the selector switch 25. Further, the capacitor 22d is connected in parallel to the switch 22b. They change the resonance frequency of the resonance circuit 21 according to the turning ON or OFF of the switch 22b. The variable capacitor 22c is connected in parallel to the capacitor 21b of the resonance circuit 21 via the selector switch 25 and it changes the resonance frequency of the resonance circuit 21 according to the capacitance value of the variable capacitor 22c. The capacitor 22e is connected in parallel to the capacitor 21b of the resonance circuit 21 via the selector switch 25 to provide a reference phase, which is not influenced by the operation of position pointing device A. These component units constitute the characteristic control means 22. Among these component units, the switch 22b, the variable capacitor 22c, and the capacitor 22e also constitute the information generating means. Normally, the switch 22b is a side switch provided on a side surface of a pen-shaped enclosure (not shown) of position pointing device A, and the variable capacitor 22c is a capacitor with pressure-dependent capacitance, the capacitance value thereof varying with the pen pressure applied to the core (not shown) of position pointing device A.

The detecting circuit 23a, the low-pass filter 23b, and the comparator 23c take out, through the low-pass filter 23b of a predetermined time constant (t), only the induced voltage, which lasts for a predetermined time length or more among the induced voltages occurring in the resonance circuit 21, and shape the waveform thereof to produce switching signal s1. Likewise, the detecting circuit 23d, the low-pass filter 23e, and the comparator 23f take out, through the low-pass filter 23e having a relatively large time constant (t), only the induced voltage, which lasts at least for the time length longer than the above-mentioned predetermined time length (hereinafter referred to as "the longest time length") among the induced voltage occurring in the resonance circuit 21 and shape the waveform thereof to produce switching signal s2. These component units constitute the instruction extracting means 23.

Figures 9A, 9B:
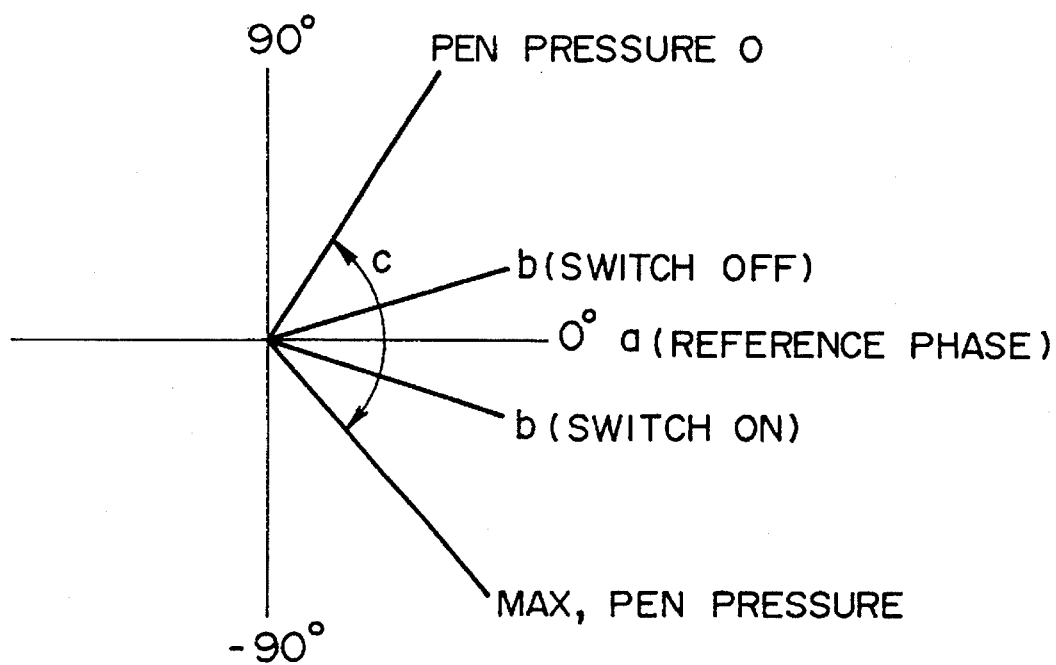
FIGS. 9A and 9B show the relationship between the levels of switching signals and connection points of a selector switch and it also illustrates the relationship between the setting of the selector switch and the resulting phases in the second embodiment.

As shown in FIG. 9A, the connecting point of the selector switch 25 changes in accordance with the levels of switching signals s1, s2. More specifically, the selector switch 25 is connected to the capacitor 22e through contact "a" when the duration of the electromagnetic wave is shorter than the predetermined time length as in the coordinate detection period; it is connected to the capacitor 22a through contact "b" when the electromagnetic wave lasts for the predetermined time length or more but shorter than the longest time length; and it is connected to the variable capacitor 22c through contact "c" when the electromagnetic wave lasts for the longest time length or more.

FIG. 9B shows the phases obtained when the selector switch 25 is connected through contact "b" and contact "c," the phase obtained when the switch is connected through contact "a" being the reference phase (0°). To be more specific, the relationship between the connecting points of the switch and the resulting phases is designed so that the value of the phase obtained when the switch is connected to the capacitor 22a is larger than that obtained when it is connected to the capacitor 22e and the sum of the values of phases obtained when it is connected to the capacitors 22a and 22d, respectively, is smaller than that obtained when it is connected to the capacitor 22e. It is further set so that the value of the phase obtained when the switch is connected to the variable capacitor 22c is smaller than that obtained when the switch is connected to the capacitor 22e when the pen pressure is 0 and it gradually increases as the pen pressure increases. The relative phase relationship is univocally defined irrespectively of the difference between the resonance frequency of the resonance circuit 21 and the oscillation frequency of the oscillator 33. Therefore, the ON/OFF state of the switch or the pen pressure can be accurately identified by comparing the obtained phases with the reference phase.

FIG. 10 and FIG. 11 present similar signal waveforms to those of FIG. 6, which are observed when the position pointing device according to this embodiment is used. FIG. 10 illustrates the signal waveforms observed when an electromagnetic wave is continuously transmitted for the predetermined time length or more but less than the longest time length during the information identifying period, that is, when the selector switch 25 is connected through contact "b" to transfer the ON/OFF information on the switch 22b. FIG. 11 illustrates the waveforms observed when an electromagnetic wave is continuously transmitted for the longest time length or more during the information identifying period, that is, when the selector switch 25 is connected through contact "c" to transfer the information on pen pressure. In the Figures, waveform VI indicates the output of the low-pass filter 23e and waveform VII indicates the output of the comparator 23f. The waveforms produced during the coordinate detection period are omitted because they are the same as those shown in FIG. 6.

According to the position pointing device of the present embodiment, the reference phase information can be transferred to the tablet during the coordinate detection period or the information identifying period, thus enabling accurate transfer of the ON/OFF state of the switch or the pen pressure as relative values. This eliminates the need for the precise agreement between the resonance frequency of the resonance circuit 21 and the oscillation frequency of the oscillator 33, thereby permitting simplified adjusting work at the time of manufacture.

Figure 12:
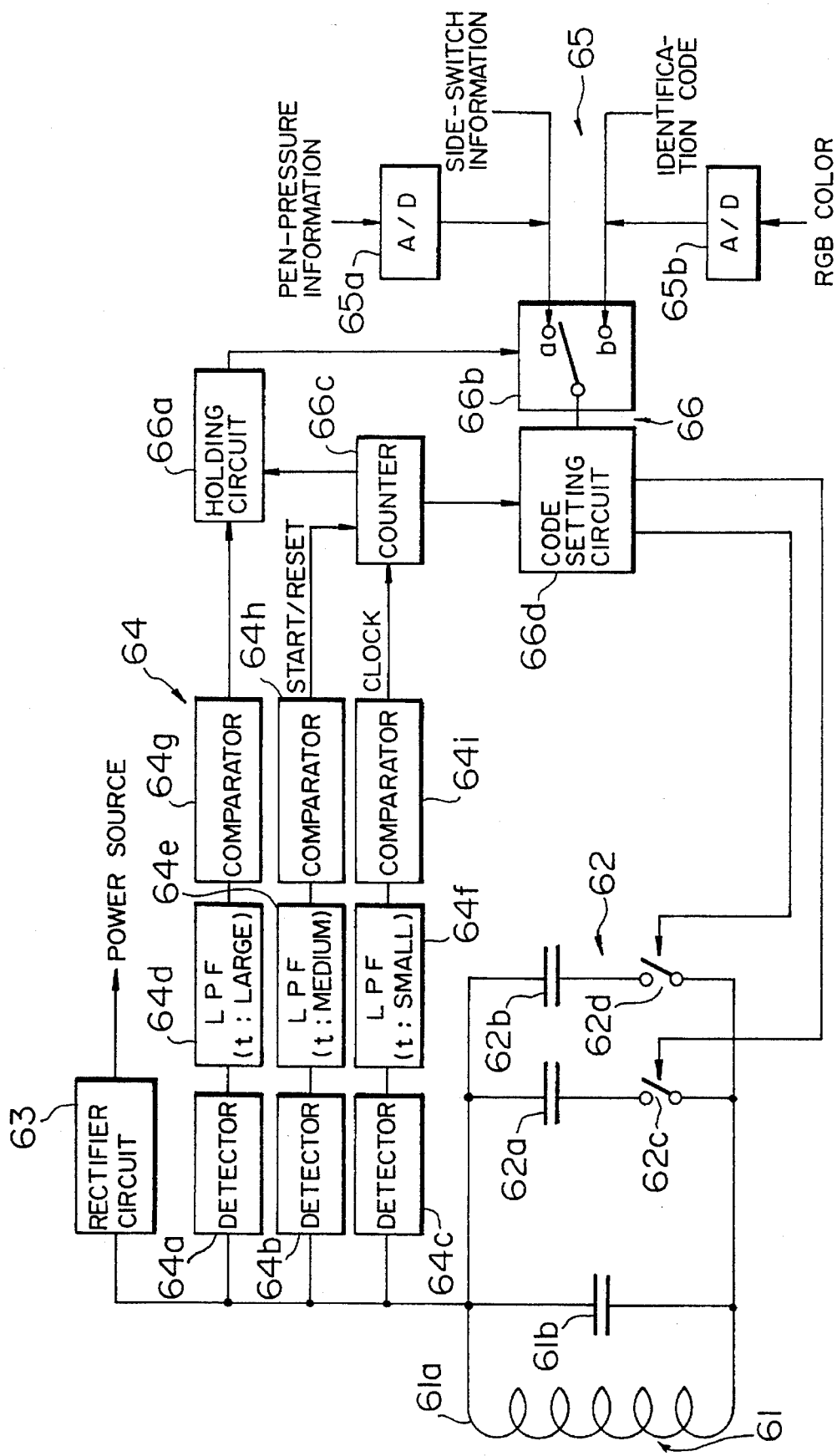
FIG. 12 is a configuration diagram illustrative of a third embodiment of the position pointing device according to the present invention.

FIG. 12 shows the third embodiment of the position pointing device in accordance with the present invention. Position pointing device A illustrated in this drawing includes a coil 61a, capacitors 61b, 62a, 62b, switches 62c, 62d, a rectifier circuit 63, detecting circuits 64a, 64b, 64c, low-pass filters (LPF) 64d, 64e, 64f, comparators 64g, 64h, 64i, analog-digital (A/D) converting circuits 65a, 65b, a holding circuit 66a, a selector switch 66b, a counter 66c, and a code setting circuit 66d.

The coil 61a and the capacitor 61b are connected in series, constituting a well-known resonance circuit 61. A characteristic control means 62 has the capacitors 62a, 62b, which are connected in parallel to the capacitor 21b of the resonance circuit 61 via the switches 62c, 62d and which change the resonance frequency of the resonance circuit 61 in accordance with the four different combinations of ON/OFF of the switches 62c, 62d, thereby controlling the resonance characteristic of the resonance circuit 61 to one of four different resonance characteristics.

The rectifier circuit 63 constitutes a power source extracting means, which takes out DC voltage from the induced voltage, occurring in the resonance circuit 61 and supplies it to other circuits as the line voltage.

The detecting circuit 64a, the low-pass filter 64d, and the comparator 64g take out, by means of a low-pass filter 64d having a relatively large time constant (t), only the induced voltage lasting for the longest time length or more from the induced voltage generated in the resonance circuit 61 and shapes the waveform thereof to generate a switching signal. The detecting circuit 64b, the low-pass filter 64e, and the comparator 64h take out, through the low-pass filters 64e having a medium time constant (t), only the induced voltage lasting for the predetermined time length or more from the induced voltage generated in the resonance circuit 61 and shape the waveform thereof to produce an actuation timing signal. Likewise, the detecting circuit 64c, the low-pass filter 64f, and the comparator 64i take out, through the low-pass filter 64f having a relatively small time constant (t), the induced voltage, which intermittently occurs at predetermined intervals and which lasts for a certain duration, which is well shorter than the aforesaid predetermined time length, from the induced voltage generated in the resonance circuit 61, and shape the waveform thereof to produce a clock. These component units constitute an instruction extracting means 64.

The A/D converting circuit 65a converts an analog voltage output from a pressure-sensitive element, not shown, into a digital value of a plurality of bits, e.g., eight bits, that is, binary code, in accordance with an analog value, that is, the pen pressure in this case, which corresponds to the pointing device information. The A/D converting circuit 65b converts an analog value, that is, an analog voltage representing an RGB color signal in this case, which corresponds to the pointing device information, into a digital value of a plurality of bits, e.g., eight bits, that is, binary code. These converting circuits and a switch (not shown) for generating side switch information and identification codes constitute an information generating means, which generates a plurality of bits of binary code representing the pointing device information.

The holding circuit 66a holds the aforesaid switching signal until it receives a reset signal from the counter 66c and then it sends the switching signal to the selector switch 66b. The selector switch 66b is normally connected to contact "a" through which it supplies real-time information, i.e., the information on the pen pressure or the side switch in this case; it is connected to contact "b" through which other information, i.e., the RGB color signals or the identification codes in this case, only while the switching signal is being applied. The counter 66c and the code setting circuit 66d are actuated by the aforesaid actuation timing signal; they successively output two bits out of the eight bits of the digital value, which are supplied to the code setting circuit 66d from the A/D converting circuit 65a, 65b or the switch (not shown) selected by the selector switch 66b, to the switches 62c and 62d simultaneously each time the count value of the counter 66c, which counts the clocks, is updated, and they output two bits of binary code out of the plurality of bits of binary code representing the pointing device information in synchronization with a clock after the actuation timing signal is received. These component units described above constitute an information setting means 66.

According to the position pointing device of this embodiment, of the pointing device information represented by digital signals, the realtime information and non-realtime information are transferred separately through switching control from the tablet and two bits of binary code can be transferred at a timing; therefore, the pointing device information represented by a plurality of bits of binary code can be transmitted more quickly from the position pointing device to the tablet, allowing much information to be transmitted at high speed without causing a lower sampling rate of coordinate detection. Further, three or more bits of binary code can be transferred at a timing.

Figure 13:
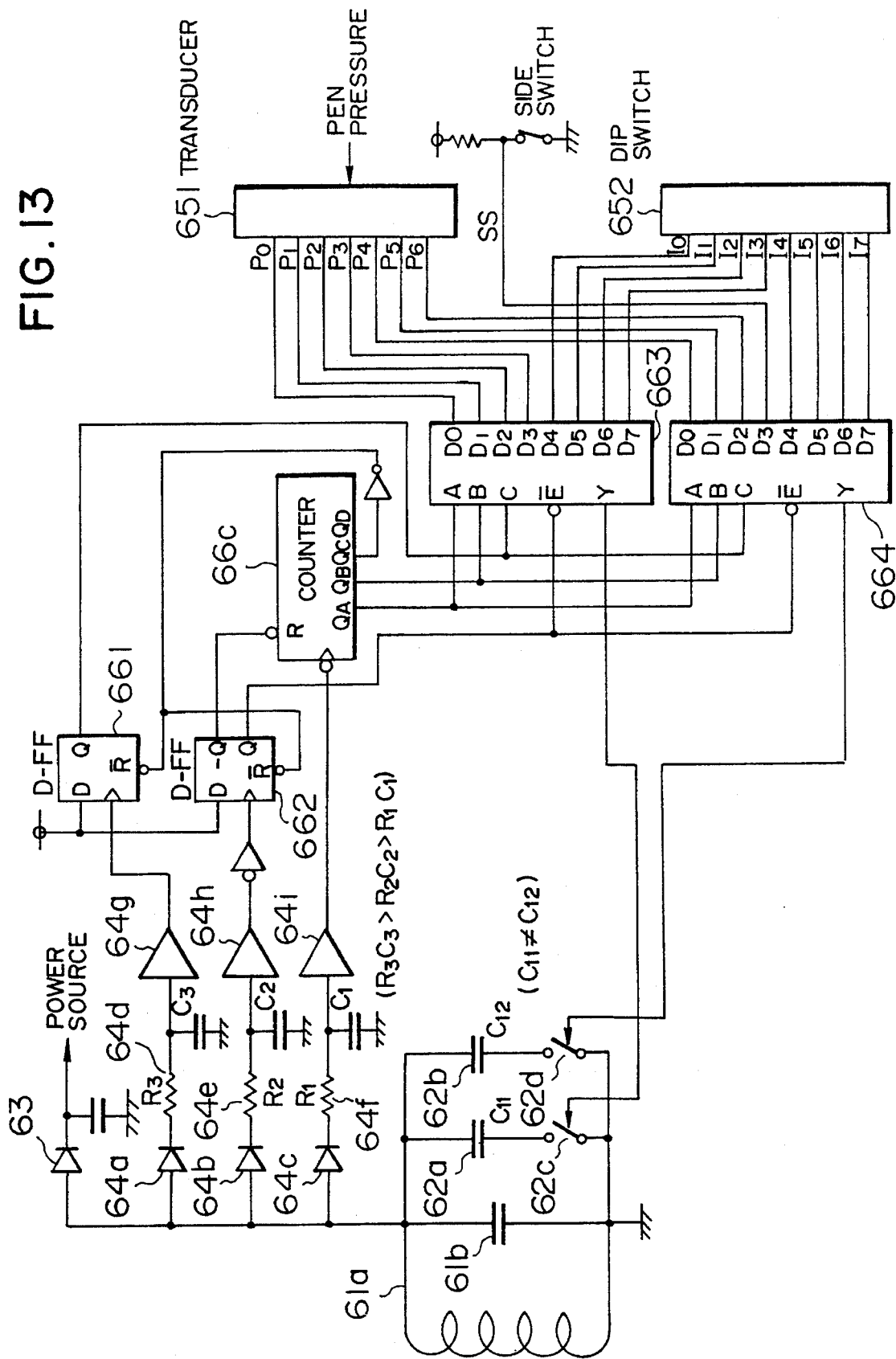
FIG. 13 is a configuration diagram illustrative of a specific example of the third embodiment of the position pointing device.

FIG. 13 shows a specific circuit of the third embodiment of the position pointing device. In this embodiment, 7-bit pen pressure information and 1-bit side switch information are used as the realtime pointing device information, while 8-bit intrinsic information on the pen (color code, identification code, etc.) is used as the non-realtime pointing device information. In the Figure, reference numerals 661 and 662 indicate D flip-flops, which constitute the holding circuit 66a shown in FIG. 12. Reference numerals 663 and 664 are multiplexers, which constitute the selector switch 66b and the code setting circuit 66d shown in FIG. 12. Reference numeral 651 denotes a transducer, which outputs a digital value corresponding to the pen pressure, and it corresponds to the A/D converting circuit 65a of FIG. 12. Reference numeral 652 is a DIP switch having eight switches and it corresponds to the A/D converting circuit 65b of FIG. 12. Other component units are identical to those of FIG. 12.

In the configuration described above, the value of the counter 66c is undefined at the beginning; however, when the count value of the counter 66c reaches a predetermined value (4 in this case) by the clocks generated by the comparator 64i in accordance with the electromagnetic waves, which are intermittently transmitted from the tablet at predetermined intervals and which last for a certain time length, which is well shorter than the predetermined time length, for the purpose of coordinate detection, the D flip-flops 661 and 662 are reset and outputs thereof reset the counter 66c. At this time, the multiplexers 663, 664 also receive a signal which prohibits outputs; therefore, the output is fixed (to 0, for example) and the state of the resonance circuit 61 is also fixed. Under this condition, the coordinate value of the position pointed by the position pointing device is determined.

Then, when the tablet continuously transmits an electromagnetic wave for the predetermined time length or more but less than the longest time length for the purpose of identifying information, the D flip-flop 662 is set by the actuation timing signal issued from the comparator 64h and the resetting of the counter 66c is released, causing the counter 66c to start counting the clocks received from the comparator 64i. The count value on the counter 66c is applied to the multiplexers 663, 664 and the two bits of binary code selected thereby cause the switches 62c and 62d to turn ON or OFF to change the resonance frequency of the resonance circuit 61, thus transferring the pointing device information to the tablet. In this case, the output of the D flip-flop 661 stays zero; therefore, the seven bits of pen information $P_0$–$P_6$ and one bit of side switch information SS produced by the transducer 651 are transferred. After that, when the counter 66c reaches a predetermined value (4 in this case), the D flip-flops 661, 662 are reset and the counter 66c stops.

Further, when the tablet continuously transmits an electromagnetic wave for the longest time length or more for identifying information, the D flip-flop 662 is set by the actuation timing signal issued from the comparator 64h, the D flip-flop 661 is set by the switching signal issued from the comparator 64g, the resetting of the counter 66c is cleared and the counter 66c starts counting the clocks received from the comparator 64i, and the output of the D flip-flop 661 becomes 1. The count value on the counter 66c is applied to the multiplexers 663, 664 and the two bits of binary code selected thereby cause the switches 62c and 62d to turn ON or OFF to change the resonance frequency of the resonance circuit 61, thus transferring the pointing device information to the tablet. In this case, the output of the D flip-flop 661 is 1; therefore, the eight bits of information $I_0$–$I_7$ intrinsic to the pen are transferred. After that, when the counter 66c reaches a predetermined value (4 in this case), the D flip-flops 661 and 662 are reset and the counter 66c stops.

Figure 14:
FIGS. 14(VII)–14(XIX) are an illustration of operation waveforms corresponding to the embodiment of FIG. 13.

FIG. 14 and FIG. 15 illustrate signal waveforms similar to those of FIG. 10 and FIG. 11, which are observed when the position pointing device according to the present embodiment is employed. FIG. 14 shows the signal waveforms observed when an electromagnetic wave is continuously transmitted for the predetermined time length or more but less than the longest time length, i.e., when the output of the D flip-flop 661 is zero and the 7-bit pen pressure information and the 1-bit side switch information supplied by the transducer 651 are transferred. FIG. 15 illustrates the signal waveforms observed when an electromagnetic wave is transmitted for the longest time length or more, i.e., when the output of the D flip-flop 661 is 1 and the 8-bit information intrinsic to the pen produced through the DIP switch 652 is transferred.

In the Figure, VIII shows the signal transmitted from the tablet, IX the signal received by (induced voltage occurring in) the resonance circuit 61, X the output signal of the low-pass filter 64f, XI the output signal of the comparator 64i, XII the output signal of the low-pass filter 64e, XIII the output signal of the comparator 64h, XIV the output signal of the low-pass filter 64d, XV the output signal of the comparator 64g, XVI the Q output of the D flip-flop 662, XVII the count value of the counter 66c, XVIII the Q output of the D flip-flop 661, and XIX the signal received by the tablet. The waveforms obtained during the coordinate detection period are the same as those shown in FIG. 6 and therefore they are omitted.

Figure 16:
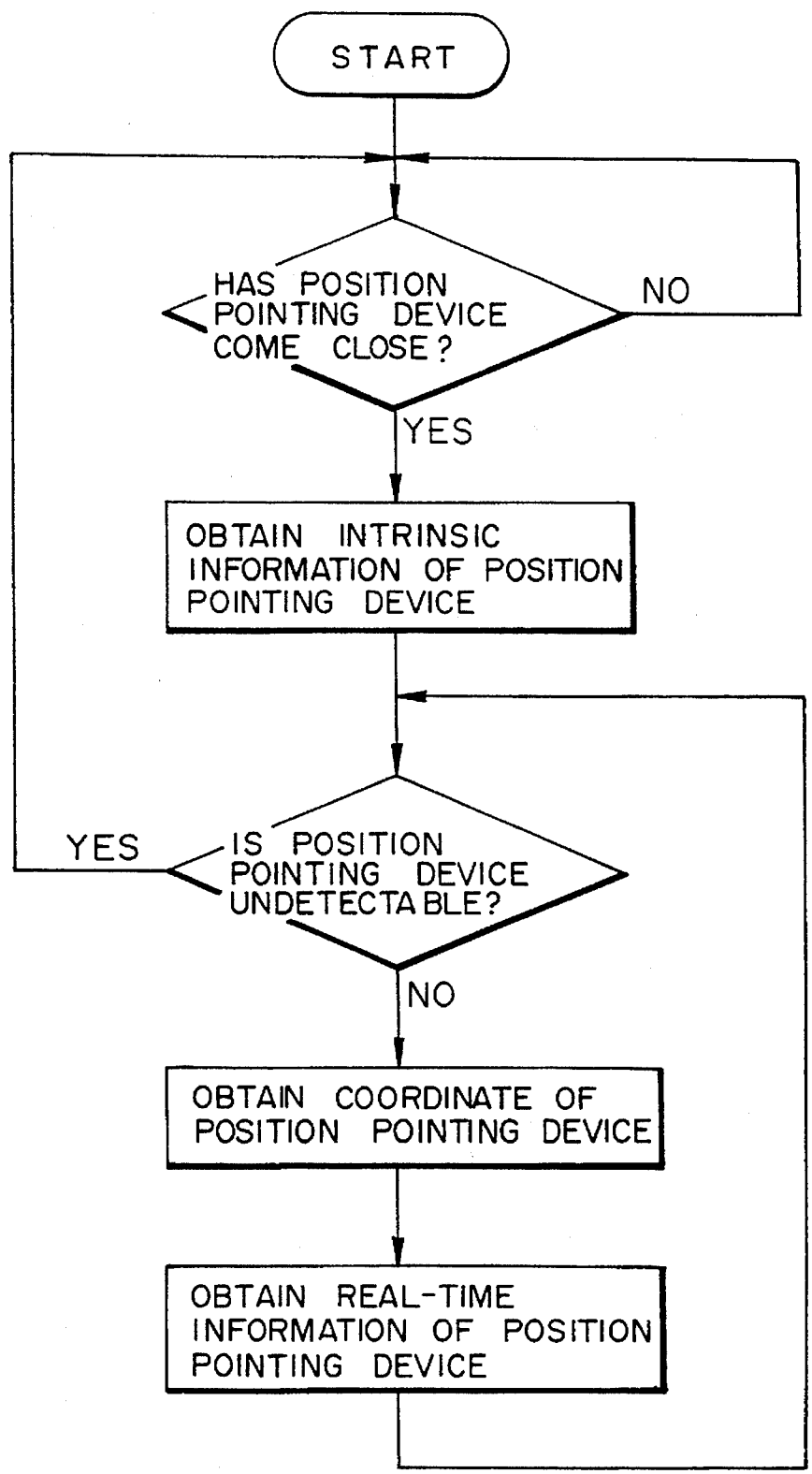
FIG. 16 is an outline flowchart illustrative of the operation of the tablet corresponding to the embodiment of FIG. 12 and FIG. 13.

FIG. 16 gives the outline operation flowchart of the tablet according to the embodiment of FIG. 12 and FIG. 13.

Figure 17:
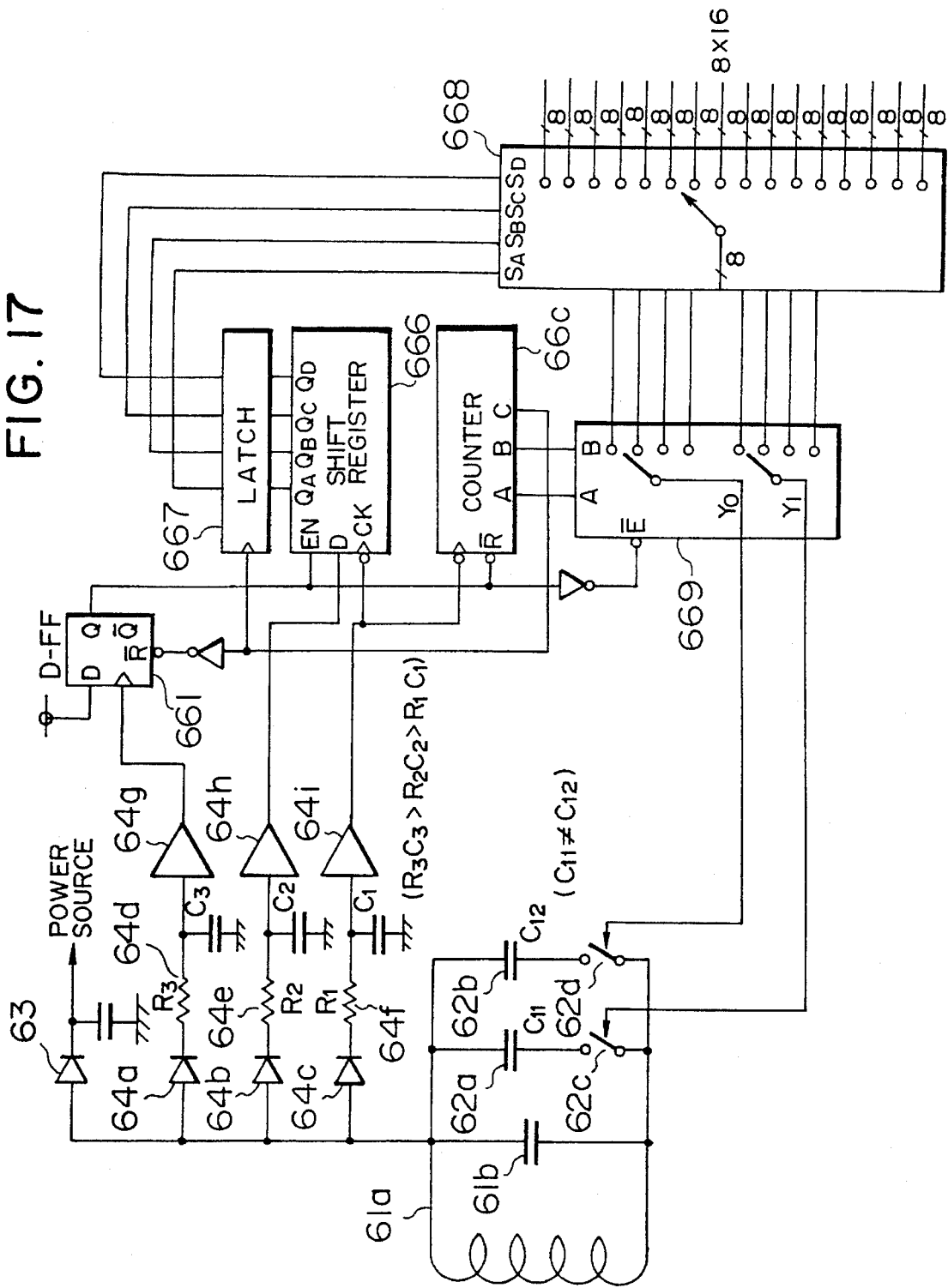
FIG. 17 is a configuration diagram illustrative of a fourth embodiment of the position pointing device according to the present invention.

FIG. 17 is illustrative of the fourth embodiment of the position pointing device in accordance with the present invention. The embodiment is an example, wherein an instruction issued from the tablet is received and information is transmitted to the tablet at the same time. More specifically, a 4-bit instruction, which assigns "1" to the electromagnetic wave lasting for the predetermined time length or more but less than the longest time length and "0" to the electromagnetic wave lasting for a certain time length, which is well shorter than the predetermined time length, is transmitted from the tablet to the position pointing device, the 4-bit instruction being preceded by the electromagnetic wave lasting for the longest time length or more as the actuation bit. In synchronization with the timing of the 4-bit instruction, the information, which has been selected by the instruction in the preceding information identifying period, is transferred from the position pointing device to the tablet by controlling the resonance frequency of the resonance circuit as previously described.

In the Figure, reference numeral 666 denotes a shift register. After the D flip-flop 661 is set by the output from the comparator 64g and actuated together with the counter 66c by the Q output thereof, the shift register 666 reads the output signal, i.e., the instruction, from the comparator 64h in accordance with the clocks received from the comparator 64i. Reference numeral 667 denotes a 4-bit latch, which latches the output of the shift register when the counter 66c reaches a predetermined value (4 in this case). Reference numeral 668 indicates a selector, which selects a set of pointing device information out from sixteen sets of pointing device information (a total of 128 bits of pointing device information, 8 bits forming a piece of the pointing device information) in accordance with the 4-bit instruction held by the latch 667. Reference numeral 669 denotes a multiplexer, which sends the pointing device information having 8 bits of binary code selected by the selector 668 to the switches 62c, 62d two bits at a time in synchronization with each bit of the instruction during the following information identifying period and transfers the pointing device information to the tablet by changing the resonance frequency of the resonance circuit 61. The rest of the configuration is the same as that of the embodiment shown in FIG. 12.

FIG. 18 shows the same signal waveforms as those of FIG. 14 (or FIG. 15), which are produced when the position pointing device of the present embodiment is employed. In the Figure, XX shows the signal transmitted from the tablet, XXI the signal received by (induced voltage in) the resonance circuit 61, XXII the output signal of the low-pass filter 64f, XXIII the output signal of the comparator 64i, XXIV the output signal of the low-pass filter 64e, XXV the output signal of the comparator 64h, XXVI the output signal of the low-pass filter 64d, XXVII the output signal of the comparator 64g, XXVIII the Q output of the D flip-flop 661, and XXIX the count value of the counter 66c. The waveforms obtained during the coordinate detection period are the same as those shown in FIG. 6; therefore, they are omitted.

The examples described above show a type of device which is designed to perform coordinate detection by alternately exchanging electromagnetic waves between the position pointing device and the tablet. The present invention can be applied in the same manner, however, to a different type of device, which is designed to perform the coordinate detection by continuously exchanging electromagnetic waves, by intermittently exchanging electromagnetic waves only during the information identifying period. In addition, in the description given above, the instructions are transferred by the duration of an electromagnetic wave; however, they can be transferred also by a pause, or furthermore, by adding various types of modulation to electromagnetic waves.

Figure 19:
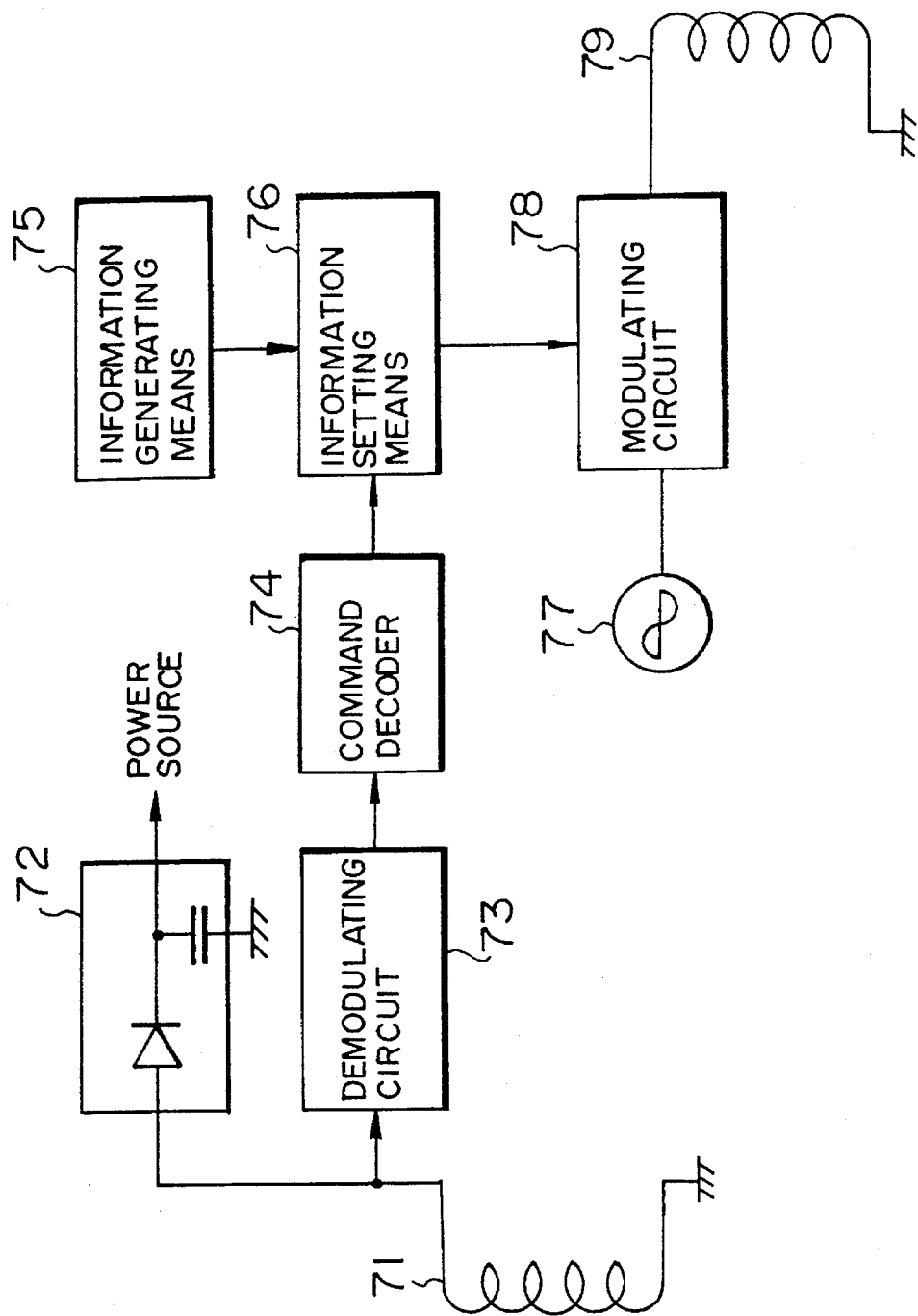
FIG. 19 is a configuration diagram illustrative of a fifth embodiment of the position pointing device according to the present invention.

FIG. 19 illustrates the fifth embodiment of the position pointing device according to the present invention; it shows an example of the position pointing device, which corresponds to the type of device designed to carry out the coordinate detection by continuously exchanging electromagnetic waves described above. More specifically, the device adds amplitude modulation, frequency modulation, frequency-shift modulation, phase-shift modulation, etc. to continuous electromagnetic waves to transfer instructions and information. The device shown in the drawing has a receiving coil 71, a rectifier circuit 72, a demodulating circuit 73, a command decoder 74, an information generating means 75, an information setting means 76, an oscillator 77, a modulating circuit 78, and a transmitting coil 79.

The electromagnetic wave transmitted from the tablet (not shown), that is, the electromagnetic wave which has been modulated in accordance with an instruction, is received by the receiving coil 71. At this time, the line voltage for driving the component units is taken out from the induced voltage, which has occurred, through the rectifier circuit 72 and it is demodulated through the demodulating circuit 73 and an instruction from the tablet is extracted through the command decoder 74. The information setting means 76 sends out the information received from the information generating means 75 to the modulating circuit 78 in accordance with the instruction, then the modulating circuit 78 modulates a carrier wave signal from the oscillator 77 in accordance with the information it has received and supplies the modulated signal to the transmitting coil 79. As a result, the electromagnetic wave, which includes the information, is emitted from the transmitting coil 79 and the information is transferred to the tablet.

Thus, according to the present invention, the position pointing device is provided with the electromagnetic wave receiving means for receiving an electromagnetic wave, which is transmitted from the tablet and which includes an operation state setting instruction, the instruction extracting means for extracting the operation state setting instruction from the received electromagnetic wave, and the operation setting means for setting the operation state in accordance with the operation state setting instruction; and the tablet is provided with the instruction generating means for issuing the operation state setting instruction directed to the position pointing device and the electromagnetic wave transmitting means for sending the electromagnetic wave, which includes the operation state setting instruction, to the position pointing device, thus making it possible to send various instructions from the tablet to the cordless position pointing device to control the operation thereof.

Further, the pointing device information can be transferred from the position pointing device to the tablet only when necessary by providing the position pointing device with a characteristic control means, which controls the intensity characteristic or frequency characteristic or the time-dependent changes in these characteristics of the electromagnetic wave emitted from the electromagnetic wave generating means in accordance with predetermined control information, the information generating means, which generates at least one piece of pointing device information, the instruction extracting means for extracting the instruction requesting the pointing device information from the received electromagnetic wave, and the information setting means for setting the pointing device information as the predetermined control information in accordance with the instruction requesting the pointing device information, and by providing the tablet with the instruction generating means for issuing the instruction requesting the pointing device information to the position pointing device, the characteristic detecting means for detecting the intensity characteristic or frequency characteristic or the time-dependent changes in these characteristics of the detected electromagnetic wave, and the information identifying means for identifying the pointing device information from the detected characteristics of the electromagnetic wave.

Furthermore, only the required type of pointing device information can be transferred from the position pointing device to the tablet by providing the position pointing device with a plurality of types of the information generating means for generating a plurality of types of pointing device information, the instruction extracting means for extracting the instruction requesting a predetermined type of pointing device information from the received electromagnetic wave, and the information setting means for selecting the appropriate type of pointing device information from the plurality of types of pointing device information in accordance with the instruction requesting the pointing device information and setting the selected pointing device information as the predetermined control information, and by providing the tablet with the instruction generating means for issuing the instruction requesting a predetermined type of pointing device information to the position pointing device and the information identifying means for identifying the predetermined type of pointing device information from the detected characteristics of the electromagnetic wave.

What is claimed is:

1. In combination, a coordinate detecting tablet for emitting a first AC field, and a position pointing device responsive to the emitted first AC field for coupling a second AC field to the tablet, the position pointing device having at least two operation states, the second AC field having a spatial distribution corresponding to a coordinate value of a pointed position of the device relative to the tablet;

the tablet including (a) means responsive to the second AC field and for deriving a signal indicative of the coordinate value of the position pointed by said position pointing device; (b) instruction generating means for generating an operation state setting instruction for the position pointing device, and (c) means responsive to the setting instruction derived by the instruction generating means for controlling a characteristic of the first AC field;

the position pointing device comprising:

(a) means for receiving the first AC field, which is emitted by the tablet and includes an operation state setting instruction, (b) instruction extracting means for extracting the operation state setting instruction from the first AC field, and (c) operation setting means for setting an operation state in accordance with said operation state setting instruction.

2. In combination, a coordinate detecting tablet for emitting a first AC field, and a position pointing device responsive to the emitted first AC field for coupling a second AC field to the tablet, the second AC field having a spatial distribution corresponding to a coordinate value of a pointed position, said tablet comprising:

instruction generating means for generating an operation state setting instruction for the position pointing device, the first field carrying said operation state setting instruction and coupling the instruction to the position pointing device, detecting means for detecting the second field;

coordinate detecting means responsive to the detected second field for determining a coordinate value of a position pointed by the position pointing device, characteristic detecting means for detecting an intensity characteristic or a frequency characteristic or a time-dependent change in these characteristics of said detected second field, and information identifying means for identifying information from said detected characteristics of the second field, said position pointing device comprising:

characteristic control means for controlling an intensity characteristic or a frequency characteristic or a time-dependent change in these characteristics of the second AC field in accordance with predetermined control information, AC field receiving means for receiving the first field and for extracting the operation state setting instruction from said first field, and operation setting means for setting one of at least two operation states in accordance with said operation state setting instruction and enabling information based on said set operation state to be entered as said predetermined control information.

3. In combination, a coordinate detecting tablet for emitting a first AC field, and a position pointing device responsive to the emitted first AC field for coupling a second AC field to the tablet, the second AC field having a spatial distribution corresponding to a coordinate value of a pointed position, said tablet comprising:

instruction generating means for generating an instruction requesting pointing device information for the position pointing device, the first field carrying said positioning device requesting instruction and coupling the instruction to the position pointing device, detecting means for detecting the second field;

coordinate detecting means responsive to the detected second field for determining a coordinate value of a position pointed by the position pointing device, characteristic detecting means for detecting an intensity characteristic or a frequency characteristic or a time-dependent change in these characteristics of said detected second field, and information identifying means for identifying pointing device information from said detected characteristics of the second field, said position pointing device comprising:

characteristic control means for controlling an intensity characteristic or a frequency characteristic or a time-dependent change in these characteristics of the second AC field in accordance with predetermined control information, information generating means for generating at least one piece of pointing device information, electromagnetic wave receiving means for receiving instruction requesting pointing device information, the first field and for extracting the instruction requesting pointing device information from said first field, and information setting means for setting said pointing device information as said predetermined control information in accordance with said instruction requesting pointing device information.

4. In combination, a coordinate detecting tablet for emitting a first AC field, and a position pointing device responsive to the emitted first AC field for coupling a second AC field to the tablet, the second AC field having a spatial distribution corresponding to a coordinate value of a pointed position, said tablet comprising:

instruction generating means for generating an instruction requesting a predetermined type of pointing device information for the position pointing device, the first field carrying said instruction requesting a predetermined type of pointing device information and coupling the instruction to the position pointing device, detecting means for detecting the second field;

coordinate detecting means responsive to the detected second field for determining a coordinate value of a position pointed by the position pointing device, characteristic detecting means for detecting an intensity characteristic or a frequency characteristic or a time-dependent change in these characteristics of said detected second field, and information identifying means for identifying a predetermined type of pointing device information from said detected characteristics of the second field, said position pointing device comprising:

characteristic control means for controlling an intensity characteristic or a frequency characteristic or a time-dependent change in these characteristics of the second AC field in accordance with predetermined control information, a plurality of types of information generating means for generating a plurality of types of pointing device information, AC field receiving means for receiving the first field and for extracting the instruction requesting the predetermined type of pointing device information from said first field, and information setting means for selecting an appropriate type of pointing device information out of said plurality of types of pointing device information and setting it as said predetermined control information in accordance with said instruction requesting the pointing device information, and said tablet comprising;

instruction generating means for generating the operation state setting instruction for the position pointing device, electromagnetic wave transmitting means for transmitting the electromagnetic wave, which includes said operation state setting instruction, to the position pointing device, electromagnetic wave detecting means for detecting the electromagnetic wave, which is generated by the position pointing device and which has certain space distribution, coordinate detecting means for determining a coordinate value of a position pointed by the position pointing device from said detected electromagnetic wave, characteristic detecting means for detecting an intensity characteristic or a frequency characteristic or a time-dependent change in these characteristics of said detected electromagnetic wave, and information identifying means for identifying information from said detected characteristics of the electromagnetic wave.

5. A position detecting device according to claim 1, wherein the instruction for the position pointing device is represented by a duration or pause of the first AC field.

6. A position detecting device according to claim 1, wherein the first AC field receiving means of the position pointing device includes a resonance circuit.

7. A position detecting device according to claim 6, wherein a resonance circuit of the position pointing device is included in a source of the second AC field.

8. A position detecting device according to claim 7, wherein the characteristic control means of the position pointing device is accomplished by changing the resonance characteristic of the resonance circuit.

9. A position pointing device according to claim 6, further comprising a power source extracting means on the position pointing device for extracting electrical energy for driving component units of the position pointing device from the first AC field as received by the resonance circuit.

10. A position pointing device for use with a coordinate detecting tablet for emitting a first AC field, the first AC field being susceptible of including an operation state setting instruction, the position pointing device comprising:

(a) a second AC field generating means for generating a second AC field having a spatial distribution corresponding to a coordinate value of a pointed position of the device relative to the tablet, (b) characteristic control means for controlling an intensity characteristic or a frequency characteristic or a time-dependent change of the intensity or frequency characteristic of the second AC field generated by said electromagnetic wave generating means in accordance with predetermined control information, (c) AC field receiving means for receiving the first AC field, (d) instruction extracting means for extracting the operation state setting instruction from said received first AC field, and (e) operation setting means for setting one of at least two operation states in accordance with said operation state setting instruction and enabling information based on said set operation state to be entered as said predetermined control information.

11. A position pointing device for use with a coordinate detecting tablet for emitting a first AC field, the first AC field being susceptible of including an instruction requesting pointing device information to be transmitted from the tablet, the position pointing device comprising:

(a) a second AC field generating means for generating a second AC field having a spatial distribution corresponding to a coordinate value of a pointed position of the device relative to the tablet, (b) characteristic control means for controlling an intensity characteristic or a frequency characteristic or a time-dependent change of the intensity or frequency characteristic of the second AC field generated by said electromagnetic wave generating means in accordance with predetermined control information, (c) information generating means for generating at least one piece of pointing device information, (d) AC field receiving means for receiving the first AC field including the instruction requesting pointing device information, instruction extracting means for extracting the instruction requesting the pointing device information from said received first AC field, and information setting means for setting said pointing device information as said predetermined control information in accordance with said instruction requesting pointing device information.

12. A position pointing device for use with a coordinate detecting tablet for emitting a first AC field, the first AC field being susceptible of including a predetermined type of pointing device information, the position pointing device comprising:

(a) a second AC field generating means for generating a second AC field having a spatial distribution corresponding to a coordinate value of a pointed position of the device relative to the tablet, (b) characteristic control means for controlling an intensity characteristic or a frequency characteristic or a time-dependent change of the intensity or frequency characteristic of the second AC field generated by said electromagnetic wave generating means in accordance with predetermined control information, (c) a plurality of types of information generating means for generating a plurality of types of pointing device information, (d) AC field receiving means for receiving the first AC field including the predetermined type of pointing device information, instruction extracting means for extracting the instruction requesting the predetermined type of pointing device information from said received first AC field, and information setting means for selecting an appropriate type of pointing device information out of said plurality of types of pointing device information and setting it as said predetermined control information in accordance with said instruction requesting pointing device information.

13. A position pointing device according to claim 10, wherein the instruction is extracted in accordance with the duration or pause of the received first AC field.

14. A position pointing device according to claim 10, wherein a resonance circuit is employed as the first AC field receiving means.

15. A position pointing device according to claim 14, wherein a resonance circuit is included in a source of second AC field.

16. A position pointing device according to claim 15, wherein the characteristic control means is accomplished by changing the resonance characteristic of the resonance circuit.

17. A position pointing device according to claim 14, comprising a power source extracting means on the position pointing device for extracting electrical energy for driving component units from the electromagnetic wave received by the resonance circuit.

* * * * *